US012517221B1

(12) United States Patent
Piracha et al.

(10) Patent No.: US 12,517,221 B1
(45) Date of Patent: Jan. 6, 2026

(54) LIDAR MULTIPATH IDENTIFICATION USING SPATIALLY ASYMMETRICAL PULSES

(71) Applicant: Zoox, Inc., Foster City, CA (US)

(72) Inventors: Mohammad Umar Piracha, Union City, CA (US); Mathew Piotrowicz, Foster City, CA (US); Samantha Marie Ting, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 939 days.

(21) Appl. No.: 17/659,023

(22) Filed: Apr. 13, 2022

(51) Int. Cl.
*G01C 3/08* (2006.01)
*G01S 7/48* (2006.01)
*G01S 7/486* (2020.01)
*G01S 17/32* (2020.01)

(52) U.S. Cl.
CPC .......... *G01S 7/4802* (2013.01); *G01S 7/4868* (2013.01); *G01S 17/32* (2013.01)

(58) Field of Classification Search
CPC ....... G01S 7/4802; G01S 7/4869; G01S 17/32
See application file for complete search history.

(56) References Cited

U.S. PATENT DOCUMENTS

2020/0371213 A1* 11/2020 Rumala ................. G01S 7/4808
2024/0134045 A1* 4/2024 Yoshida ................. G01S 7/4808

FOREIGN PATENT DOCUMENTS

WO   WO 02065153 A1 * 8/2002 ............. G06V 20/13

* cited by examiner

*Primary Examiner* — Mark Hellner
(74) *Attorney, Agent, or Firm* — Lee & Hayes, P.C.

(57) ABSTRACT

Techniques for determining whether a reflected lidar pulse has been subject to multipath reflection effects are disclosed. An initially emitted lidar pulse is generated having a property that varies across the pulse (either spatially in cross-section and/or temporally). Detected reflected pulses are analyzed to determine if they have similar or different properties. If the properties of both pulses are similar, the reflected pulse was likely not affected by multipath reflection. If the properties are similar, the reflected pulse likely was affected by multipath reflection. Pulses having a high likelihood of multipath reflections may be discarded (or disregarded) for subsequent processing.

20 Claims, 7 Drawing Sheets

LIDAR MULTIPATH IDENTIFICATION USING SPATIALLY ASYMMETRICAL PULSES

BACKGROUND

Various systems, including autonomous vehicles, utilize lidar systems that use lasers to emit pulses into an environment and sensors to detect pulses that are reflected back from the surfaces of objects in the environment. Such reflected pulses may, in turn, be used to perform detection of objects, such as vehicles, pedestrians, and bicycles, in an environment. If a detected pulse has been reflected off of multiple surfaces in an environment rather than a single surface of an object, the data generated based on the detected pulse may be an inaccurate representation of the environment and objects therein which, for example in the case of autonomous vehicles and other systems, may lead to unsafe operating conditions.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
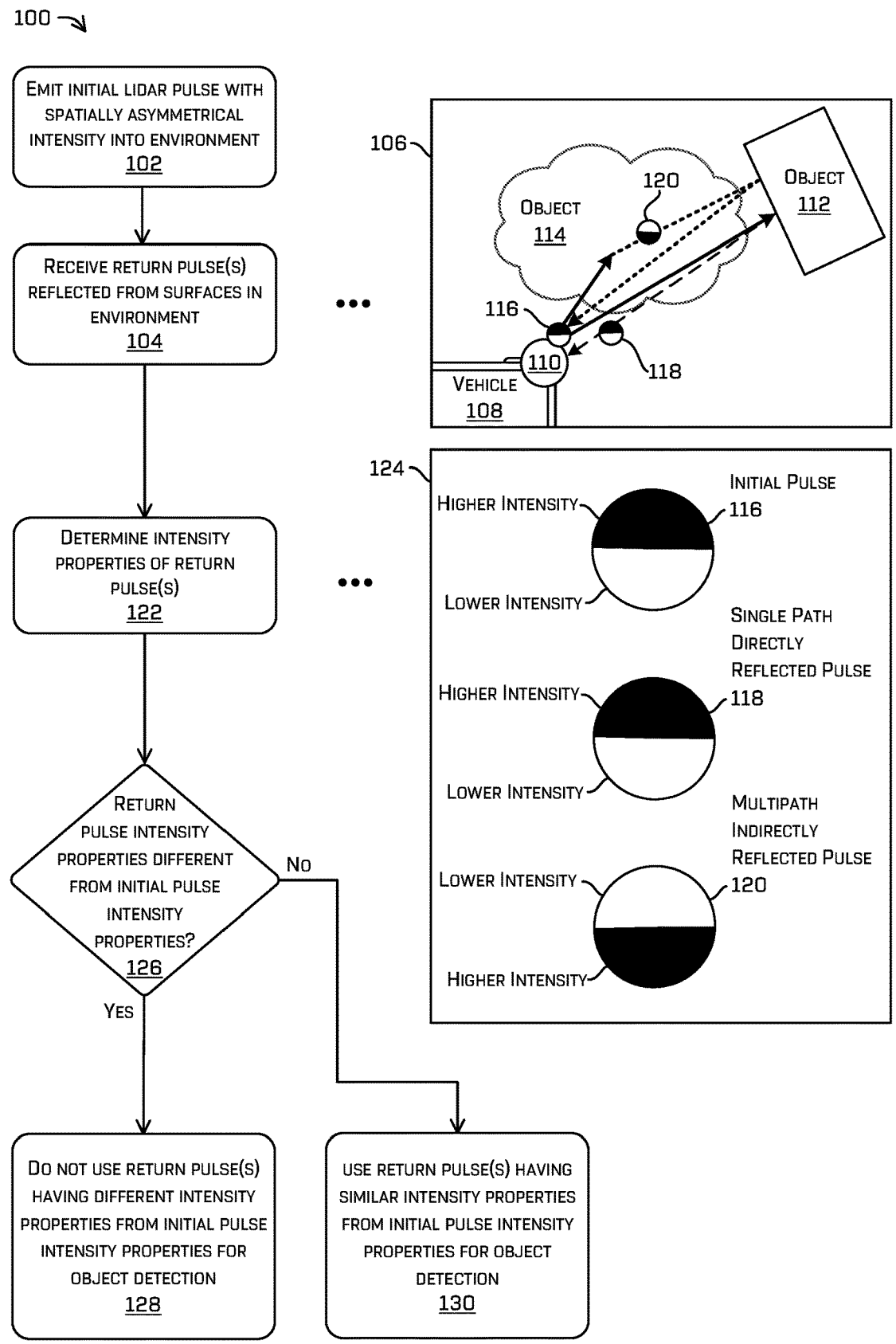
FIG. 1 is a pictorial flow diagram of an example process for analyzing and filtering reflected pulses, in accordance with examples of the disclosure.

Techniques (e.g., processes, systems) are discussed herein for determining whether lidar pulses have reflected from two or more surfaces and/or indirectly from surfaces in an environment and distinguishing such pulses from lidar pulses that have relatively directly reflected from a single surface and/or probabilities associated therewith. In examples, a lidar system may emit a lidar pulse having an asymmetrical cross-sectional shape by transmitting or otherwise causing (e.g., using filtering and/or other pulse modification techniques) one or more portions of the emitted pulse to have properties that differ from the properties of one or more other portions of the emitted pulse. Such properties may include one or more of intensity, power, polarization, phase, coherence, spectral content, modulation, spatial shape, temporal shape, and other lidar pulse properties. One or more sensors of the lidar system may detect a returning lidar pulse that was reflected from one or more surfaces in the environment. The lidar system and/or an associated vehicle computing system may measure the reflected lidar pulse to determine a likelihood (probability, etc.) that the returning lidar pulse was reflected from more than one surface in the environment and use this likelihood to determine surface detection data of a surface. For example, the lidar system and/or an associated vehicle computing system may measure the properties of the reflected pulse and determine whether such properties indicate that the pulse has likely reflected from two or more surfaces (e.g., represents a multipath reflection) and/or may be the result of a substantially indirect reflection. In various examples, this indication of multipath reflection and/or substantially indirect reflection may be used in combination with other data to determine the likelihood that the return pulse is a multipath reflection and/or the result of a substantially indirect reflection. If the reflected pulse is determined to have reflected from two or more surfaces (e.g., has greater than a threshold probability of being so), the lidar system and/or an associated vehicle computing system may determine surface detection data of a surface by excluding data associated with the reflected pulse, while if the reflected pulse is determined to have reflected from one surface, the lidar system and/or an associated vehicle computing system may determine surface detection data using data associated with the reflected pulse.

The lidar system and/or an associated vehicle computing system may determine that a reflected pulse that has reflected from two or more surfaces based on determining that the properties of the reflected pulse differ from the properties of the emitted pulse. As noted, such properties may include one or more of intensity, power, polarization, phase, coherence, spectral content, modulation, spatial shape, temporal shape, and other lidar pulse properties. For example, and as described in more detail below, if a cross-sectional two-dimensional representation of the measured portions of a reflected pulse is substantially similar to a cross-sectional two-dimensional representation of corresponding portions of an emitted pulse, a lidar system and/or a vehicle computing system may determine that the reflected pulse represents a relatively direct (e.g., substantially perpendicular) single reflection of the emitted pulse off of a surface in the environment. Based on this determination, the lidar system and/or an associated vehicle computing system may use this reflected pulse and/or data associated with the pulse to perform object detection and/or perform other vehicle control functions.

Alternatively, if a lidar system and/or a vehicle computing system determines that a cross-sectional two-dimensional representation of the measured portions of a reflected pulse is substantially different from a cross-sectional two-dimensional representation of corresponding portions of an emitted pulse, the lidar system and/or a vehicle computing system may determine that the reflected pulse represents a multipath reflection of the emitted pulse off of two or more surfaces in the environment. Based on this determination, the lidar system and/or an associated vehicle computing system may eliminate the reflected pulse and/or associated data from consideration for use in generating data related to object detection. Alternatively, or in addition, in those examples in which a multipath return is likely, environmental geometry (such as may be accessed from a map) may be used in conjunction with one or more angle of reflection (e.g., angle of reflection at the first reflection and/or at a subsequent reflection) to determine a point of reflection and a (e.g., final) reflected surface.

In various examples, various types of lidar characteristics and/or properties may be used to determine whether a reflected pulse is a multipath reflected pulse and/or otherwise indirectly reflected from one or more surfaces in an environment. For example, temporal properties of the reflected pulse may be measured and used to determine whether the reflected pulse has reflected off of a specular (e.g., highly reflective or mirror-like) surface. If the temporal width and/or shape of the reflected pulse is (e.g., substantially) greater than the temporal width and/or shape of the emitted pulse, a lidar system and/or a vehicle computing system may determine that the reflected pulse has likely indirectly reflected off of a surface (e.g., to the side, above, and/or below the lidar system) before being reflected back to the lidar system (e.g., following at least one other subsequent reflection).

In other examples, the cross-sectional shape of the reflected pulse may be determined and used to determine whether the reflected pulse has reflected off of a specular (e.g., highly reflective or mirror-like) surface. If the cross-sectional shape of the reflected pulse is (e.g., substantially) different than that of the emitted pulse (e.g., wider in one or more dimensions), a lidar system and/or a vehicle computing system may determine that the reflected pulse has likely indirectly reflected off of a surface (e.g., to the side, above, and/or below the lidar system) before being reflected back to the lidar system (e.g., following at least one other subsequent reflection).

In various examples, the lidar system and/or an associated vehicle computing system may determine that a returned pulse with one or more properties (e.g., intensity, power, polarization, phase, coherence, spectral content, modulation, spatial shape, temporal shape, etc.) that are substantially similar to one or more corresponding properties of the initially emitted spatially asymmetric lidar pulse may be a potentially accurate reflected pulse that the vehicle computing system may use to generate data related to object detection. Alternatively, or in addition, the lidar system and/or an associated vehicle computing system may determine that a returned pulse has one or more properties that are substantially different from one or more corresponding properties of the initially emitted spatially asymmetric lidar pulse may not be a potentially accurate reflected pulse since that pulse is more likely to have been the result of multiple reflections from surfaces in the environment. Accordingly, the vehicle computing system may filter such likely multipath reflected pulses from consideration (e.g., discarding, disregarding, down-weighting, etc.) from use in generating surface detection data and/or object detection data.

Any number of the techniques described above and in detail below may be combined with any other one or more techniques. As a non-limiting example, an asymmetric pulse return may be evaluated to determine a likelihood of reflection based on whether the asymmetry generally corresponds to the emitted pulse. Such likelihood may be augmented based on, for example, a distance measurement, an amplitude of the emitted pulse, an amplitude associated with the return pulse, a determined reflectivity of a surface off of which the return has reflected, and/or a power of the return pulse (e.g., as compared to the emitted pulse). In such an example, if the asymmetry is indicative of no intermediate reflections but, based on one or more of these additional evaluation criteria, a multipath reflection is likely, then a multipath reflection may be presumed and/or used to inform the overall likelihood.

For example, if the distance traveled by the return pulse (e.g., significantly) exceeds an expected or determined distance of a singly reflected return pulse, a multipath reflection may be determined to be more likely. In another example, if the amplitude (e.g., of the average, portion, etc.) of the return pulse is (e.g., significantly) lower than an expected or determined distance of a singly reflected return pulse, a multipath reflection may be determined to be more likely. In another example, if the amplitude (e.g., of the average, portion, etc.) of the return pulse is (e.g., significantly) lower than an amplitude associated with an estimated reflection from one or more of a specular or Lambertian surface, a multipath reflection may be determined to be more likely. In another example, if the power and/or intensity (e.g., of one or more sections of a cross-section) of the return pulse is (e.g., significantly) lower than an expected or determined power or intensity of a singly reflected return pulse, a multipath reflection may be determined to be more likely. In such examples, this additional multipath reflection likelihood data may be used to inform and/or determine an overall likelihood of multipath reflection for the return pulse.

The systems and techniques described herein may be directed to leveraging measurements of returned lidar pulses to improve the quality of sensor data used to generate surface detection data, object detection data, and/or other data that may be used by a vehicle, such as an autonomous vehicle, to more accurately identify objects in an environment. Using this improved data, such a vehicle may generate safer and more efficient trajectories for use in navigating through an environment. In examples, the systems and techniques described herein may also, or instead, be directed to leveraging measurements of returned lidar pulses to generate data that may enable a vehicle, such as an autonomous vehicle, to more accurately predict trajectories of other vehicles and/or mobile objects in an environment and therefore operate more safely in the environment using such predictions. In particular examples, the systems and techniques described herein can utilize data structures containing surface detection data and/or object detection data based on the disclosed improved analysis of returned lidar pulses to more accurately and efficiently determine the locations of objects in an environment and the proximity of an autonomous vehicle to such objects. By using the lidar pulse analysis techniques described herein to more accurately distinguish between single reflection path returned lidar pulses and multiple reflection path returned lidar pulses, the examples described herein may result in increased certainty and accuracy of object detections, thereby allowing an autonomous vehicle to generate more accurate and/or safer trajectories for the autonomous vehicle to traverse in the environment.

For example, techniques described herein may increase the reliability of the determination of locations, dimensions, and/or other physical parameters of objects in the environment, reducing the likelihood of failing to detect or inaccurately detecting an object. That is, techniques described herein provide a technological improvement over existing object detection, classification, tracking, and/or navigation technology. In addition to improving the accuracy of object detections and determinations of the size, shape, and location of such objects, the systems and techniques described herein can provide a smoother ride and improve safety outcomes by, for example, more accurately providing safe passage to an intended destination through an environment that is also occupied by one or more objects.

The techniques described herein may also improve the operation of computing systems and increase resource utilization efficiency. For example, computing systems, such as vehicle computing systems, may more efficiently perform object detection using the techniques described herein because the disclosed examples may eliminate multipath reflected pulses from consideration in the generation of surface detection data and/or object detection data, thereby requiring the processing of fewer returned lidar pulses and/or associated data than would be required using conventional techniques.

The systems and techniques described herein can be implemented in several ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein may be applied to semi-autonomous and/or manually operated vehicles. In another example, the techniques can be utilized in an aviation or nautical context, or in any system involving objects or entities having dimensions and/or other physical parameters that may not be known to the system. Further, although discussed in the context of pulses originating as lidar emissions, detection using lidar sensors, and processing using lidar sensor data, other types of sensors and emitters are contemplated, as well as other types of sensor data. Furthermore, the disclosed systems and techniques may include processing using various types of components and various types of data and data structures, including, but not limited to, various types of image data or sensor data (e.g., stereo cameras, time-of-flight data, radar data, sonar data, and the like). Additionally, the techniques described herein can be used with real data (e.g., captured using sensor(s)), simulated data (e.g., generated by a simulator), or any combination of the two.

Figure 10:
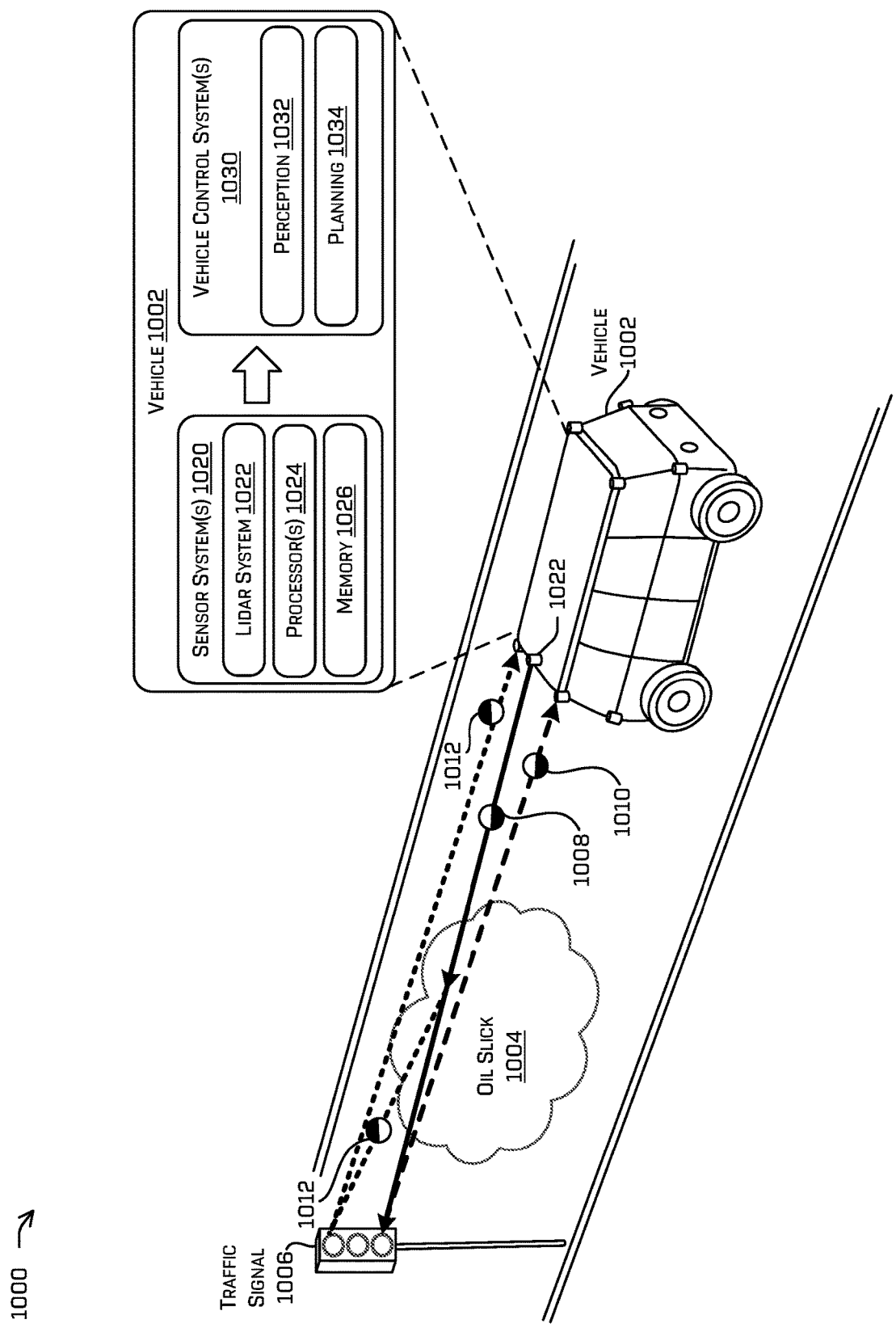
FIG. 10 is a diagram of an example environment and an example autonomous vehicle that may be operating in the environment, in accordance with examples of the disclosure.
Figure 11:
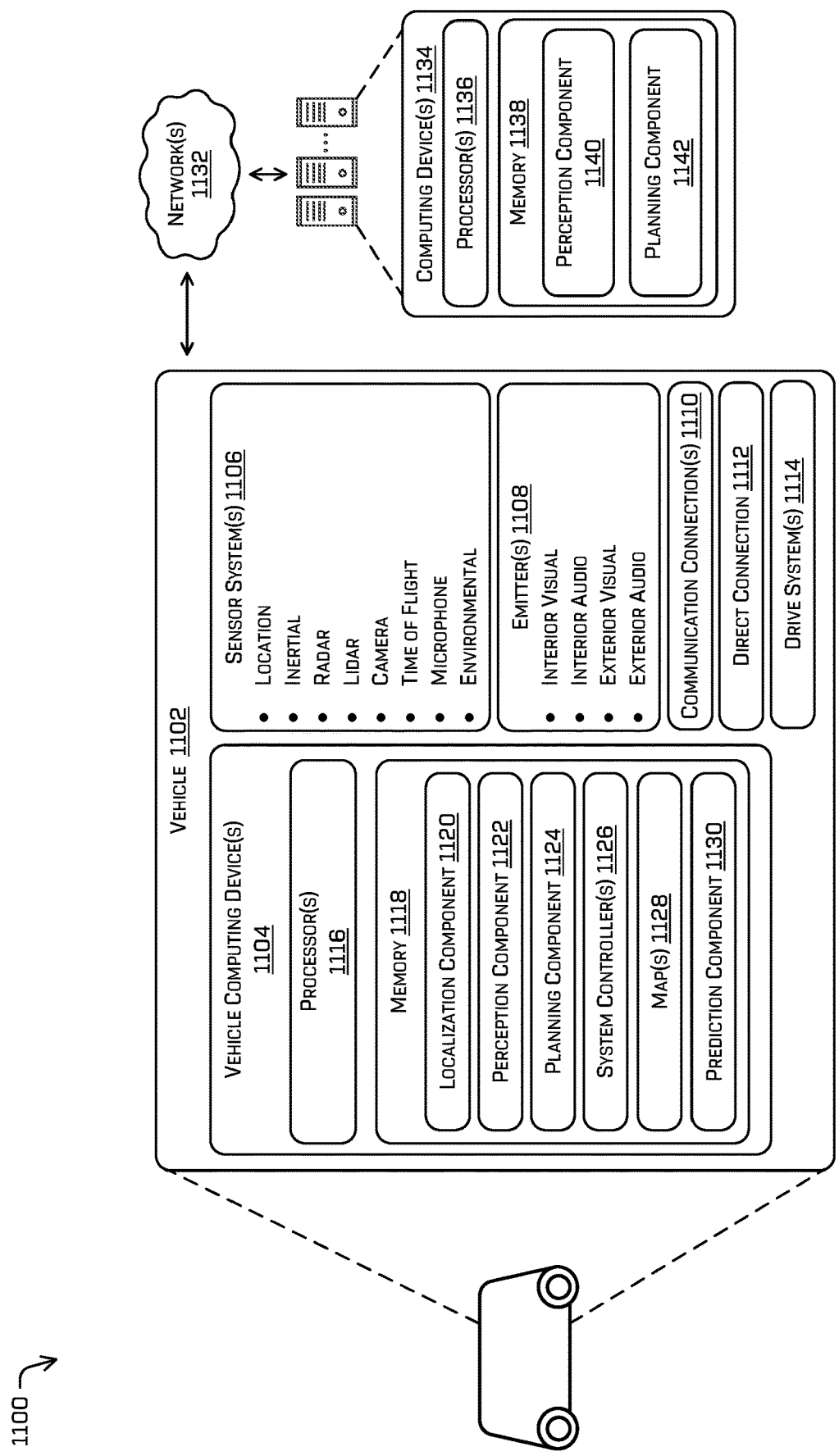
FIG. 11 is a block diagram of an example system for implementing the techniques described herein.

FIG. 1 is a pictorial flow diagram of an example process 100 for determining whether reflected lidar pulses are reflected from a single surface or two or more surfaces (e.g., a multipath reflection) in an environment. In some examples, one or more operations of the process 100 may be implemented by a vehicle computing system, such as by using one or more of the components and systems illustrated in FIG. 10 and described below. For example, one or more components and systems can include those associated with the one or more sensor systems 1020, the perception component 1032, and/or the planning component 1034 of the vehicle 1002 illustrated in FIG. 10. Alternatively, or in addition, one or more components and systems can include those associated with the one or more sensor systems 1106 and/or the perception component 1122 of the vehicle 1102 illustrated in FIG. 11. In some examples, the one or more operations of the process 100 may also, or instead, be performed by a remote system in communication with a vehicle, such as the perception component 1140 of the computing device(s) 1134 illustrated in FIG. 10. Such processes may also, in turn, be performed by the device itself (e.g., using onboard electronics) such that a standalone device may produce such signals without the need for additional computational resources. In still other examples, the one or more operations of the process 100 may be performed by a combination of a remote system and a vehicle computing systems. However, the process 100 is not limited to being performed by such components and systems, and the components and systems of FIGS. 10 and 11 are not limited to performing the process 100.

At operation 102, a sensor system configured at or otherwise associated with an autonomous vehicle may emit a signal into an environment. In some examples, this sensor system may include a lidar system that includes one or more lidar emitters and one or more lidar sensors (e.g., photodetectors). At operation 102, such a lidar system may emit an initial spatially (e.g., cross-sectionally) asymmetrical lidar pulse into the environment in which the autonomous vehicle is operating. Such an environment may include one or more other objects that a vehicle computing system configured at the autonomous vehicle may detect. For example, a vehicle computing system configured at the autonomous vehicle may use one or more sensors of the sensor system to detect stationary objects (e.g., buildings, road markings, signs) and moving objects (e.g., people, bicycles, other vehicles) in the environment. While the examples used herein may refer to one or more lidar sensor systems (e.g., including one or more lidar emitters (e.g., lasers) and one or more lidar sensors (e.g., laser sensors)), in various other examples, other types of sensor systems using various other combinations of emitters and sensors may be used to implement the disclosed systems and techniques, such as camera sensors, radar emitters and sensors, sonar emitters and sensors, ultrasonic transducers, audio sensors, and/or any other suitable sensors and sensor systems.

The spatially asymmetrical lidar pulse emitted at operation 102 may be a laser emission that is controlled to generate a pulse having particular properties at particular cross-sectional portions of the pulse. For example, a laser emitter may be configured to generate a laser emission with varying power and/or intensity properties at different sections of a cross-section of the pulse (e.g., when "viewed" or represented head-on or facing the emitter). Alternatively, or in addition, the pulse emitted at operation 102 may be a laser emission that is controlled to generate a pulse having a particular cross-sectional shape (e.g., rectangle, oval, circle, etc. when "viewed" or represented head-on or facing the emitter). Additionally, or alternatively, the pulse emitted at operation 102 may be a laser emission that is controlled to generate a pulse having one or more particular properties at one or more particular cross-sectional portions of the pulse, while not having similar properties at one or more other cross-sectional portions of the pulse. For example, the pulse emitted at operation 102 may be emitted to have certain light properties at three of four cross-sectional portions of the pulse and to have no light emitted in the fourth cross-sectional portion of the pulse. Alternatively, or in addition, the pulse emitted at operation 102 may be a laser emission that is controlled to generate a pulse having a particular temporal shape (e.g., rise and fall at particular levels over a particular period of time). Additional properties include, but are not limited to, phase, polarity, coherence, spectral content, modulation, etc. Further details describing such examples will be provided below.

The lidar pulse emitted at operation 102 may be generated by controlling one or more lasers configured at a lidar system to transmit a pulse having varying intensity at various cross-sectional portions of the pulse. Alternatively, or in addition, the lidar pulse emitted at operation 102 may be generated by controlling one or more lasers configured at a lidar system to transmit a pulse having a particular cross-sectional shape. Alternatively, or in addition, the lidar pulse emitted at operation 102 may be generated by controlling one or more lasers configured at a lidar system to transmit a pulse having varying intensity at particular times to give the emitted pulse a particular temporal shape. Alternatively, or in addition, the lidar pulse emitted at operation 102 may be generated by using one or more filters, modulators, wave plates, or other laser modulation components and/or techniques to modify one or more emitted lasers to generate a lidar pulse having particular cross-section with respect to one or more properties including power and/or intensity properties, phase, polarity, coherence, spectral content, modulation, a particular cross-sectional shape, and/or a particular temporal shape, among others.

In other examples, a laser emitter may be configured with a one or more components (e.g., one or more shutters) that alternately block and permit emission of one or more lasers (or any portion thereof) to generate a pulse with a particular shape and/or properties (e.g., a constantly variable filter). In other examples, the spectral content of a laser emission may be modulated spatially and/or over time during the pulse transmission to generate an asymmetrical pulse having spectral content that varies over space and/or time. In other examples, phase, spectral content, modulation, frequency, polarization, and/or coherence may be modulated over time (e.g., by using a rotating polarizer). In other examples, any other properties and/or aspects of light and/or laser emissions may be adjusted and/or modulated over time and/or space to generate an asymmetrical lidar pulse that may be utilized in any of the examples described herein. Further, asymmetry may refer to, herein, any properties of an emission which, when reflected, lead to a measurable difference.

In various examples, one or more properties (e.g., intensity, power, spectral content, phase, coherence, etc.) of one or more sections of a cross-section of an emitted pulse may be modulated over time to generate a particular sequence or pattern (e.g., code) over time in the sections to generate an asymmetrical pulse that can then be compared to the return pulse. For example, a lidar system may be configured with two emitters (or a single emitter with two modulators or shutters) that may be configured to emit two sections of a cross-section of an emitted pulse. The lidar system may be configured to emit a first pulse for a first section of the cross-section in a first pattern of intensity (e.g., repeating high and low intensity pulses at a same length of time) and a second pulse for a second section of the cross-section in a second pattern of intensity (e.g., repeating high and low intensity pulses where the high intensity pulse is emitted for twice as long as the low intensity pulse). In such an example, the lidar system may determine whether the return pulse demonstrates the same modulation pattern in its corresponding cross-section to determine a probability that the return pulse was subject to a multipath reflection.

In various examples, a shape and/or size of one or more sections of a cross-section of an emitted pulse may vary. For example, a lidar system may be configured with two emitters (or a single emitter with two modulators) that may be configured to emit two sections of a cross-section of an emitted pulse. The first of the two sections may be emitted as a particular shape (e.g., square) while the second of the two sections may be emitted as another, different particular shape (e.g., circle). In such an example, the lidar system may determine whether the return pulse demonstrates the same or different shapes in the corresponding sections of its cross-section to determine a probability that the return pulse was subject to a multipath reflection.

At operation 104, one or more sensors (e.g., photodetectors) of the sensor system configured at the autonomous vehicle may receive one or more return signals that are the result of the reflection of the pulse initially emitted at operation 102. For example, where a lidar system is configured at the autonomous vehicle and the initially emitted signal was a lidar pulse, at operation 104 one or more reflected lidar pulses may be received at one or more lidar sensors of the lidar system. These reflected lidar pulses may be reflections of the initially emitted lidar pulse.

A reflected pulse may be the reflection of an emitted pulse off of one or more surfaces in an environment. While lidar pulses are used in many of the examples set forth herein, the emitted and reflected pulses described herein may be of any type and wavelength. For sensor systems that may be configured on vehicles, ideally a returned pulse that has reflected off of one surface of one object is detected by a sensor and used to generate surface detection data and/or object detection data associated with the object off of which the returned pulse has reflected. However, objects and conditions in environments are unpredictable and there may be interference and/or obstruction in the reflection path of a pulse following its emission into the environment. Moreover, a single pulse emitted into an environment may generate multiple reflected return pulses. The disclosed systems and techniques may facilitate determining which, if any, of such multiple return pulses provides information that may be used to accurately detect objects in the environment.

An example 106 illustrates a top-down view of an environment that includes a vehicle 108 that may be configured with a lidar sensor system 110. A vehicle computing system of the vehicle 108 may operate the sensor system 110 to detect objects in the environment, such as an object 112, which may be any type of mobile or stationary object on the environment (e.g., building, road barrier, person, car, bicycle). There may also be other objects in the environment that may interfere with the detection of the object 112, such as the object 114, which may also be any type of mobile or stationary object on the environment. In various examples, the object 114 may be a semi-solid or gaseous object, such as mist, steam, smoke, smog, etc. In various examples, the object 114 may be a liquid object, such as an oil slick, puddle, etc. In certain examples, the object 114 may have a specular or mirror-like surface (e.g., like a window, oil slick, water puddle, etc.).

The lidar sensor system 110 may emit an initial lidar pulse 116 (solid arrow) into the environment. The initial pulse 116 may have particular lidar properties. For example, the initial pulse may be emitted using relatively greater laser intensity in an upper cross-sectional portion of the pulse and relatively lower laser intensity in a lower cross-sectional portion of the pulse. This pulse cross-section of the initially emitted lidar pulse 116 is represented in example 106 as a circle with a solid black upper half and a solid white lower half. The initial pulse 116 may also, or instead, be emitted with other properties, such as phase, polarity, coherence, spectral content, modulation, a particular cross-sectional shape, and/or a particular temporal shape, as described herein.

This initial pulse 116 may be reflected back to the sensor system 110 via one or more paths. For example, a return pulse 118 (represented as the arrow with large dashes) may be a pulse reflected from a surface of the object 112 without reflecting on any other surfaces (e.g., a single reflection). The return pulse 118 may also reflect directly from a surface of the object 112, for example, by reflecting substantially perpendicularly off of the surface of the object 112 (e.g., reflecting at or nearly at a 180-degree angle). Because the return pulse 118 may be a directly and singly reflected return pulse, the return pulse 118 may be measured in various ways to determine information about the object 112 by the sensor system 110 and/or a perception component of the vehicle 108 that can then be used to determine surface detection data and/or object detection data for the object 112.

When a return lidar pulse is a single reflection pulse reflected substantially perpendicularly off of a surface, the lidar properties of the return pulse may substantially resemble those of the initial pulse. Thus, the return pulse 118 of example 106 may have particular lidar properties that are similar to those of the initial pulse 116. For example, where the initial pulse 116 was be emitted using relatively higher laser intensity in an upper cross-sectional portion of the pulse and relatively lower laser intensity in a lower cross-sectional portion of the pulse, the return pulse 118 may also have relatively higher laser intensity in an upper cross-sectional portion of the return pulse and relatively lower laser intensity in a lower cross-sectional portion of the return pulse. The cross-section of the return pulse 118 is represented in example 106 as a circle with a solid black upper half and a solid white lower half, similar to the representation of the cross-section of the initial pulse 116. The return pulse 118 may also, or instead, have other properties that are substantially similar to those of the initial pulse 116, such as phase, polarity, coherence, spectral content, modulation, a particular cross-sectional shape, and/or a particular temporal shape that resemble those of the initial pulse 116. In various examples, a return pulse that has been subject to an odd number (e.g., of substantially similar types) of reflections may also have one or more properties that are substantially similar to those of the initially emitted pulse. In such examples, the vehicle computing device may evaluate one or more other properties that of such pulses to determine whether a multipath reflection has occurred. For example, the vehicle computing device may evaluate the amplitude, distance, overall pulse intensity and/or power, reflection properties, etc. to further determine the likelihood that a return pulse has been subject to multipath reflection.

Reflected pulses resulting from the emission of the initial pulse 116 into the environment may be affected by other objects in the environment, potentially rendering such reflected pulses less useful in performing object detection than pulses reflected substantially perpendicularly off a single surface. For example, a return pulse 120 (represented as an arrow with small dashes) may reflect first off of the surface of the object 114, and then off of the surface of the object 112, before returning to the sensor system 110 for detection.

When a return lidar pulse is a multipath reflection pulse reflected off of multiple surfaces, the lidar properties of the return pulse may (e.g., substantially) differ from those of the initial pulse. Alternatively, or in addition, when a return lidar pulse is not reflected substantially perpendicularly off of a surface, the lidar properties of the return pulse may (e.g., substantially) differ from those of the initial pulse. Often these two issues occur with the same return pulse. For example, the return pulse 120 may be first reflected off of the object 114 at an obtuse (e.g., relatively large obtuse) angle (e.g., reflected off of a puddle, oil slick, wall, etc.), continuing to travel to object 112 where it is then reflected back to the sensor system 110. When reflecting off of a surface or object at an angle that is not substantially perpendicular, the initial pulse properties may be inverted or otherwise altered in the reflected return pulse.

For example, the return pulse 120 of example 106 may have particular lidar properties that are dissimilar to those of the initial pulse 116 due to the alteration and/or inversion of such properties on introduced by reflection from a substantially non-perpendicular surface and/or from multiple surfaces. For instance, where the initial pulse 116 was emitted using relatively higher laser intensity in an upper cross-sectional portion of the pulse and relatively lower laser intensity in a lower cross-sectional portion of the pulse, the cross-section of the return pulse 120 may have inverted laser intensity properties due to the obtuse reflection from the surface of the object 114, with relatively lower laser intensity in an upper cross-sectional portion of the return pulse and relatively higher laser intensity in a lower cross-sectional portion of the return pulse. The cross-section of the return pulse 120 is represented in example 106 as a circle with a solid white upper half and a solid black lower half, representing a substantially opposite distribution of laser intensity in the cross-section than that of the initial pulse 116. The return pulse 120 may also, or instead, have other properties that are differ from those of the initial pulse 116, such as phase, polarity, coherence, spectral content, modulation, a skewed cross-sectional shape compared to the cross-sectional shape of the initial pulse 116, and/or a "stretched" temporal shape compared to the cross-sectional shape of the initial pulse 116, as described herein.

As will be appreciated, the information about the object 112 and/or surfaces associated therewith that can be determined from the return pulse 120 may be relatively less accurate and/or useful than the information that may be determined from the return pulse 118 due to the interference of other objects in the reflection path between the object 112 and the sensor system 110, as indicated, for example, by the alteration of the lidar properties of the return pulse 120 as compared to the initial pulse 116. For example, the return pulse 120 may indicate a closer object distance than the return pulse 118.

Therefore, in various examples, a vehicle computing system and/or a sensor system may perform operations as described herein to detect and remove return pulses affected by multipath and/or indirect reflection from consideration for object detection processing and retain single path direct reflection return pulses for such processing. By implementing these operations, a vehicle computing system and/or a sensor system may reduce the resources required for processing return pulses because indirect and/or multipath reflection return pulses may be removed and therefore no processing resources are wasted on them. Furthermore, a vehicle computing system and/or a sensor system implementing these operations may increase the accuracy and quality of the resulting surface detection data and/or object detection data because single path and/or direct reflection return pulses that are likely to result in more accurate object detections are processed to generate surface detection data and/or object detection data.

At operation 122, the vehicle computing system may begin this process of determining whether to use detected return pulses to generate surface detection data and/or object detection data by determining the lidar properties of such return pulses, such as the laser intensity and/or power represented in cross-sections of such return. Such properties may also, or instead, include spatial and/or temporal properties. The lidar properties of a reflected lidar pulse may include laser intensity and/or laser power in various cross-sectional portions of the pulse, a cross-sectional shape of the pulse (e.g., square, rectangle, circle, etc.), and/or a temporal shape of the pulse (e.g., intensity and/or power represented over time and/or a time of rise to peak power from base power equivalent to a time of fall from peak power to base power). One or more properties of a return pulse may be spatially and/or temporally asymmetrical, such as having greater laser intensity in one or more particular portions of the pulse and lesser laser intensity in one or more other particular portions of the pulse. The value of the pulse intensity may also, or instead, vary over time in a skewed or unevenly distributed manner. One or more properties of a return pulse may also, or instead, be symmetrical, such as a having symmetrical cross-sectional shape (e.g., square, rectangle, circle, etc.) and/or a symmetrical temporal shape.

In examples, at operation 122, other types of pulse properties may also, or instead, be determined. Such properties may include phase, frequency, polarization, spectral content, and/or coherence. Such properties may be determined for a particular section of a cross-section of the pulse, for a particular point within a pulse (e.g., at a particular time, as reflected by a pulse cross-section, etc.) and/or over a period of time (e.g., determining a temporal shape). Any other properties and/or aspects of light and/or laser emissions may be determined for any time, time period, and/or space. Any properties of any emission which, when reflected, may lead to a measurable difference may also, or instead, be determined at operation 122.

An example 124 illustrates cross-sectional representations of the pulses introduced in the example 106. The cross-section of the initial pulse 116 emitted in the example 106 is illustrated in example 124 as a spatially circular shaped pulse with the higher intensity portion of the pulse represented in black while the lower intensity portion of the pulse is represented in white. As can be seen in this example, the initially emitted pulse 116 is a symmetrically shaped pulse with asymmetrically distributed laser intensity properties.

The return pulses of the example 106 are also represented in example 124. The cross-section of the return pulse 118 reflected directly from the object 112 in the example 106 is illustrated in example 124 as a spatially circular shaped pulse with the higher intensity portion of the pulse represented in black while the lower intensity portion of the pulse is represented in white. As can be seen in this example, the return pulse 118 has a similar shape and similar laser intensity properties (e.g., similarly distributed and oriented in the cross-section) to those of the initial pulse 116.

The cross-section of the return pulse 120 reflected indirectly from the object 112 after reflecting off of the surface of the object 114 in the example 106 is illustrated in example 124 as a spatially circular-shaped pulse with the higher intensity portion of the pulse represented in black while the lower-intensity portion of the pulse is represented in white. As can be seen in this example, while the return pulse 120 has a similar shape, this return pulse has different laser intensity properties from those of the initial pulse 116. Here, the lower-intensity portion of the cross-section of the return pulse 120 is in the upper portion of the cross-section while the higher intensity portion of the cross-section of the return pulse 120 is in the lower portion of the cross-section. This may be the result of the initial pulse 116 first reflecting off of the surface of the object 114, which altered the lidar properties resulting in the return pulse 120 having substantially different lidar properties than the initially emitted pulse.

Using the determined lidar properties of the return pulses, at operation 126, the vehicle computing system and/or a sensor system may determine whether one or more lidar properties of such return pulses are substantially similar to one or more corresponding lidar properties of the initially emitted pulse. If the lidar properties of a return pulse are substantially similar to that of the initial pulse, the vehicle computing system and/or sensor system may determine that that return pulse was not affected by a multipath and/or indirect reflection and, at operation 130, may utilize that return pulse (e.g., data associated with that return pulse) to generate data for one or more object detection operations.

For example, referring now to the examples 106 and 124, the vehicle computing system of the vehicle 108 and/or the sensor system 110 may determine that the return lidar pulse 118 has cross-sectional lidar intensity properties that are similar to those of the initially emitted lidar pulse 116 (e.g., higher intensity in the upper half of the cross-section and lower intensity in the lower half of the cross-section). Based on this determination, the vehicle computing system of the vehicle 108 and/or the sensor system 110 may use the return pulse 118 and/or data associated therewith to generate data for one or more object detection operations, such as an operation to detect the object 112.

If, at operation 126, the vehicle computing system and/or a sensor system determines that one or more lidar properties of a return pulse are not substantially similar to one or more corresponding lidar properties of an initially emitted pulse, the vehicle computing system and/or sensor system may determine that that return pulse was affected by a multipath and/or indirect reflection and, at operation 128, may not utilize that return pulse (e.g., data associated with that return pulse) to generate data for one or more object detection operations. Alternatively, or in addition, the vehicle computing system and/or a sensor system may, at operation 128 use the pulse and/or data associated therewith for other purposes. For example, the vehicle computing system and/or a sensor system may use the pulse to determine that an unexpected or unusual object may be present in the environment, such as a mist, smoke, smog, puddle, oil slick, etc.

For example, referring again to examples 106 and 124, the vehicle computing system of the vehicle 108 and/or the sensor system 110 may determine that the return lidar pulse 120 has cross-sectional lidar intensity properties that are different from those of the initially emitted lidar pulse 116 (e.g., lower intensity in the upper half of the cross-section and higher intensity in the lower half of the cross-section of the return pulse, substantially opposite of the cross-section of the initially emitted pulse). Based on this determination, the vehicle computing system of the vehicle 108 and/or the sensor system 110 may not use the return pulse 120 and/or data associated therewith to generate data for one or more object detection operations, such as an operation to detect the object 112.

In examples, at operation 126, any one or more pulse properties of any type may also, or instead, be compared to those of an initially emitted pulse. As noted herein. such properties may include frequency, polarization, phase, spectral content, and/or coherence among others. Such properties may be determined for a particular point within a pulse (e.g., at a particular time, as reflected by a pulse cross-section, etc.) and/or over a period of time (e.g., determining a temporal shape). Any other properties and/or aspects of light and/or laser emissions may be determined for any time, time period, and/or space and compared to corresponding properties of an initially emitted pulse at operation 126. Any properties of any emission that, when reflected, may lead to a measurable difference may also, or instead, be determined and compared to corresponding properties of an initially emitted pulse at operation 126.

At operation 126, for return pulses that have substantially similar lidar properties to those of initial pulse 116, the vehicle computing system and/or sensor system may further determine that such a return pulse has an intensity, return time, and/or other characteristics that are consistent with a single reflection return pulse, and may therefore retain the return pulse for use in the generation of data for object detection operations at operation 130. However, the vehicle computing system and/or sensor system may determine, at operation 126 that a return pulse has an intensity, return time, and/or other characteristics that are inconsistent with a single reflection return pulse, even if one or more lidar properties of the return pulse are substantially similar to the lidar properties of the initial pulse 116, and may therefore remove that return pulse from consideration for use in the generation of data for object detection operations at operation 128. For example, a return pulse may have been received beyond a threshold amount of time after the emission of the initial pulse and/or may have a greatest intensity less than a threshold intensity and may therefore be removed from conidiation as a pulse of relative higher value.

Figure 2:
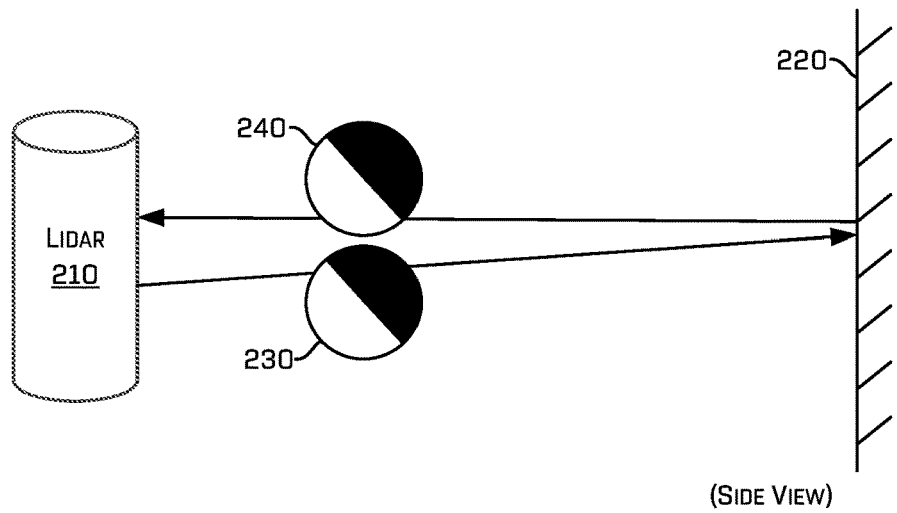
FIG. 2 is a diagram of an example environment and example lidar pulses emitted and reflected in the environment, in accordance with examples of the disclosure.

FIG. 2 is a side view of an example environment 200 in which a lidar 210 may be configured. The lidar 210 may be any one or more sensor systems as described herein and/or a component thereof, such as one or more of the components and systems illustrated in FIG. 10 or FIG. 11 and described below.

The lidar 210 may emit a lidar pulse 230 into the environment 200. The lidar 210 may be configured to emit the lidar pulse 230 with one or more particular lidar properties. For example, the lidar 210 may be configured to generate the pulse 230 with a first spatial portion using a relatively higher laser intensity and a second, distinct spatial portion using a relatively lower laser intensity. As shown in this figure, the higher intensity spatial portion of the pulse 230 is at the upper right of the cross-section of the pulse and represented in black, while the lower intensity spatial portion of the pulse 230 is at the lower left of the cross-section of the pulse and represented in white. In this example, the cross-sectional shape of the pulse 230 is a symmetrical circle.

The pulse 230 may reflect from a surface 220 in the environment 200 and return to the lidar 210 as the return pulse 240. The reflection of the pulse 230 may be a single reflection substantially perpendicularly off of the surface 220. In such examples, the lidar properties of the resultant return pulse 240 may be substantially similar to those of the initial pulse 230. As illustrated in this figure, the return pulse 240 may have a first spatial portion with a relatively higher laser intensity and a second, distinct spatial portion with a relatively lower laser intensity, represented by the black and white portions the cross-section of the return pulse 240. As can be seen here, the cross-sectional shape and laser intensity properties of the return pulse 240 as substantially similar. In such examples, based on determining that one or more properties of the two pulses are substantially similar, a sensor system and/or vehicle computing system associated with the lidar 210 may use the return pulse 240 and/or data associated therewith to generate surface detection data and/or object detection data and/or perform one or more other object detection operations.

Figure 3:
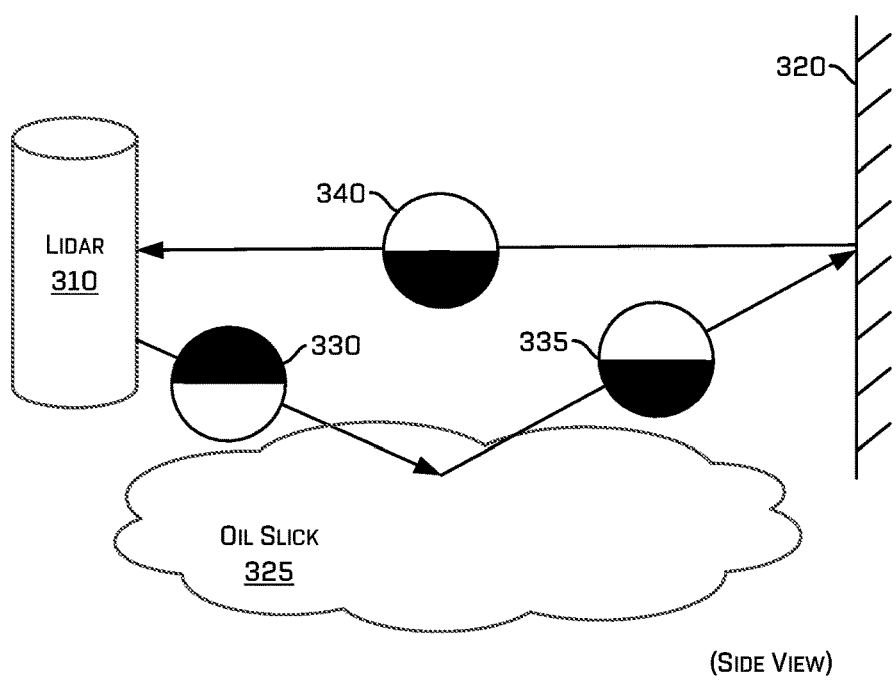
FIG. 3 is a diagram of another example environment and example lidar pulses emitted and reflected in the environment, in accordance with examples of the disclosure.

FIG. 3 is a side view another example environment 300 in which a lidar 310 may be configured. The lidar 310 may be any one or more sensor systems as described herein and/or a component thereof, such as one or more of the components and systems illustrated in FIG. 10 or FIG. 11 and described below.

The lidar 310 may emit an initial lidar pulse 330 into the environment 300. The lidar 310 may be configured to emit the initial lidar pulse 330 with one or more particular lidar properties. For example, the lidar 310 may be configured to generate the initially emitted pulse 330 with a first spatial portion using a relatively higher laser intensity and a second, distinct spatial portion using a relatively lower laser intensity. As shown in this figure, the higher intensity spatial portion of the initially emitted pulse 330 is at the upper half of the cross-section of the pulse and represented in black, while the lower intensity spatial portion of the initially emitted pulse 330 is at the lower half of the cross-section of the pulse and represented in white. In this example, the cross-sectional shape of the initially emitted pulse 330 is a symmetrical circle.

The initially emitted pulse 330 may reflect from a surface of an oil slick 325 in the environment 300, resulting in reflected pulse 335. In various examples, the reflectively of a surface may affect the reflective behavior of an emitted lidar pulse. For example, a reflection from a specular surface (e.g., a highly reflective surface such as the surface the oil slick 325, a puddle of water, a mirror, etc.) may result in a return pulse that with properties that are inverted or otherwise altered from those of the initially emitted pulse. Alternatively, a reflection from a Lambertian surface (e.g., a relatively non-reflective or matte surface such as the of a wall painted with flat paint, a carpet, etc.) may result in a return pulse that with properties that are less likely to be inverted or otherwise altered from those of the initially emitted pulse.

For example, the reflection of the initially emitted pulse 330 on the specular surface of the oil slick 325 may cause the alteration and/or inversion of one or more lidar properties of the initially emitted pulse 330 resulting in reflected pulse 335. For example, a relatively obtuse horizontal reflection of the initially emitted pulse 330 from a horizontal surface such as the oil slick 325 may cause a vertical inversion of the lidar properties in the resultant reflected pulse 335 (e.g., properties at the top of the cross-section of the initially emitted pulse 330 are at the bottom of the cross-section of the reflected pulse 335, and vice versa). As shown here, the cross-section of the reflected pulse 335 has a higher intensity spatial portion at the lower half of the cross-section of the pulse and represented in black, while a lower intensity spatial portion of the pulse 335 is at the higher half of the cross-section of the pulse and represented in white, substantially the opposite of the initially emitted pulse 330.

The reflected pulse 335 may then reflect substantially perpendicularly off of the surface 320. Because this reflection may be substantially perpendicular to the path of travel of the pulse 335, the lidar properties may not be altered and the properties of the resulting return pulse 340 may be similar to those of the reflected pulse 335, which were substantially opposite those of the initially emitted pulse 330. Thus, and as can be seen here, the cross-sectional shape and laser intensity properties of the return pulse 340 that is ultimately detected by the lidar 310 are substantially different (e.g., vertically opposite) those of the initially emitted pulse 330. Therefore, based on determining that one or more corresponding properties of the initial pulse and the return pulse are substantially different, a sensor system and/or vehicle computing system associated with the lidar 310 may not use the return pulse 340 and/or data associated therewith to generate surface detection data and/or object detection data. Alternatively, or in addition, a sensor system and/or vehicle computing system associated with the lidar 310 may use the return pulse 340 and/or data associated therewith to perform one or more operations, for example, based on determining that the return pulse may have been affected by multipath and/or indirect reflection.

Figure 4:
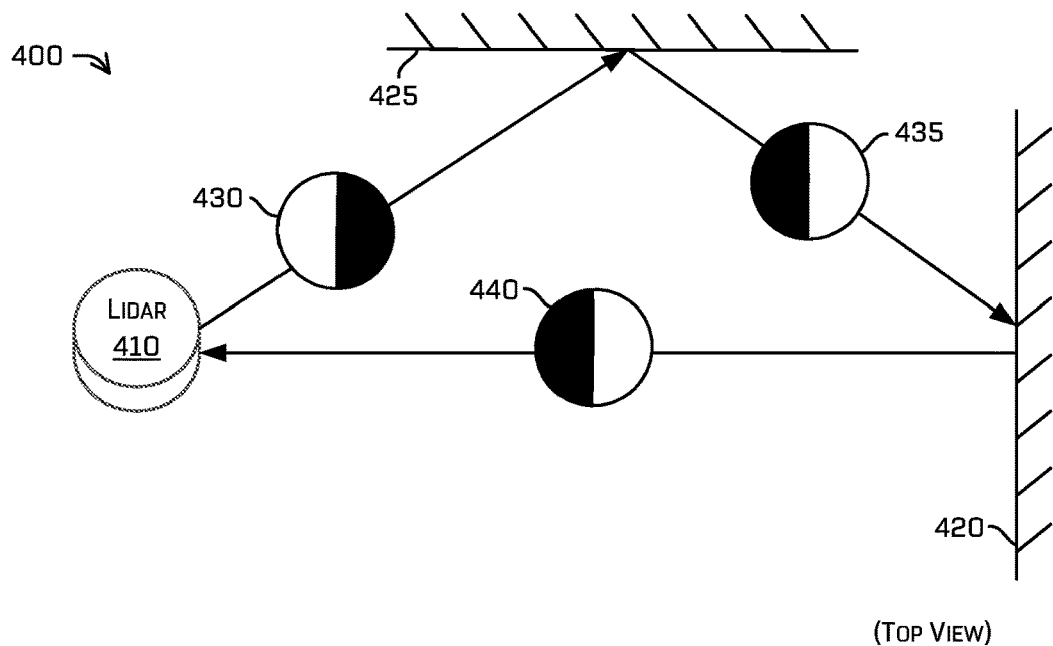
FIG. 4 is a diagram of another example environment and example lidar pulses emitted and reflected in the environment, in accordance with examples of the disclosure.

FIG. 4 is a top view of another example environment 400 in which a lidar 410 may be configured. The lidar 410 may be any one or more sensor systems as described herein and/or a component thereof, such as one or more of the components and systems illustrated in FIG. 10 or FIG. 11 and described below.

The lidar 410 may emit an initial lidar pulse 430 into the environment 400. The lidar 410 may be configured to emit the initial lidar pulse 430 with one or more particular lidar properties. For example, the lidar 410 may be configured to generate the initially emitted pulse 430 with a first spatial portion using a relatively higher laser intensity and a second, distinct spatial portion using a relatively lower laser intensity. As shown in this figure, the higher intensity spatial portion of the initially emitted pulse 430 is on the right half of the cross-section of the pulse and represented in black, while the lower intensity spatial portion of the initially emitted pulse 430 is on the left half of the cross-section of the pulse and represented in white. In this example, the cross-sectional shape of the initially emitted pulse 430 is a symmetrical circle.

The initially emitted pulse 430 may reflect from a vertical surface 425 in the environment 400, resulting in reflected pulse 435. The reflection of the initially emitted pulse 430 on the vertical surface 425 may cause the alteration and/or inversion of one or more lidar properties of the initially emitted pulse 430 resulting in reflected pulse 435. For example, a relatively obtuse vertical reflection of the initially emitted pulse 430 from the vertical surface 425 may cause a horizontal inversion of the lidar properties in the resultant reflected pulse 435 (e.g., properties at the right of the cross-section of the initially emitted pulse 430 are at the left of the cross-section of the reflected pulse 435, and vice versa). As shown here, the cross-section of the reflected pulse 435 has a higher intensity spatial portion on the left half of the cross-section of the pulse and represented in black, while a lower intensity spatial portion of the pulse 435 is at the right half of the cross-section of the pulse and represented in white, substantially the opposite of the initially emitted pulse 430.

The reflected pulse 435 may then reflect substantially perpendicularly off of the surface 420. Because this reflection may be substantially perpendicular to the path of travel of the pulse 435, the lidar properties may not be altered and the properties of the resulting return pulse 440 may be similar to those of the reflected pulse 435, which were substantially opposite those of the initially emitted pulse 430. Thus, and as can be seen here, the cross-sectional shape and laser intensity properties of the return pulse 440 that is ultimately detected by the lidar 410 are substantially different (e.g., opposite) those of the initially emitted pulse 430. Therefore, based on determining that one or more corresponding properties of the initial pulse and the return pulse are substantially different, a sensor system and/or vehicle computing system associated with the lidar 410 may not use the return pulse 440 and/or data associated therewith to generate surface detection data and/or object detection data. Alternatively, or in addition, a sensor system and/or vehicle computing system associated with the lidar 410 may use the return pulse 440 and/or data associated therewith to perform one or more operations, for example, based on determining that the return pulse may have been affected by multipath and/or indirect reflection.

In examples, a sensor system or vehicle computing system may use the form of lidar property alteration determined to determine information about an environment and/or a return pulse. For example, a sensor system or vehicle computing system may determine that, because the return pulse 340 of FIG. 3 has lidar properties that are substantially vertically inverted (e.g., properties at the top of the cross-section of the initially emitted pulse 330 are at the bottom of the cross-section of the return pulse 340, and vice versa), the initially emitted pulse 330 may have been relatively obtusely reflected from a horizontal surface. Similarly, a sensor system or vehicle computing system may determine that, because the return pulse 440 of FIG. 4 has lidar properties that are substantially horizontally inverted (e.g., properties at the right of the cross-section of the initially emitted pulse 430 are at the left of the cross-section of the return pulse 440, and vice versa), the initially emitted pulse 430 may have been relatively obtusely reflected from a vertical surface.

Rather than using a substantially horizontal (e.g., initially emitted 330 of FIG. 3) or vertical (e.g., initially emitted 430 of FIG. 4) division between portions of an emitted pulse cross-section having different lidar properties, in examples, a pulse may be emitted with a diagonal division between portions of an emitted pulse cross-section having different lidar properties, for example, as shown by pulse 230 in FIG. 2. An emitted pulse having such a cross-sectional division between portions with differing lidar properties may indicate either a substantially horizontal or vertical obtuse reflection. In other examples, multiple lasers and/or laser modification components may be used to emit pulses of any shape or property variation that may be used to compare to returned pulses to determine whether such return pulses have been multipath and/or indirectly reflected. Of course, any form (angle or otherwise) used to create an asymmetric pulse is contemplated.

Figure 5:
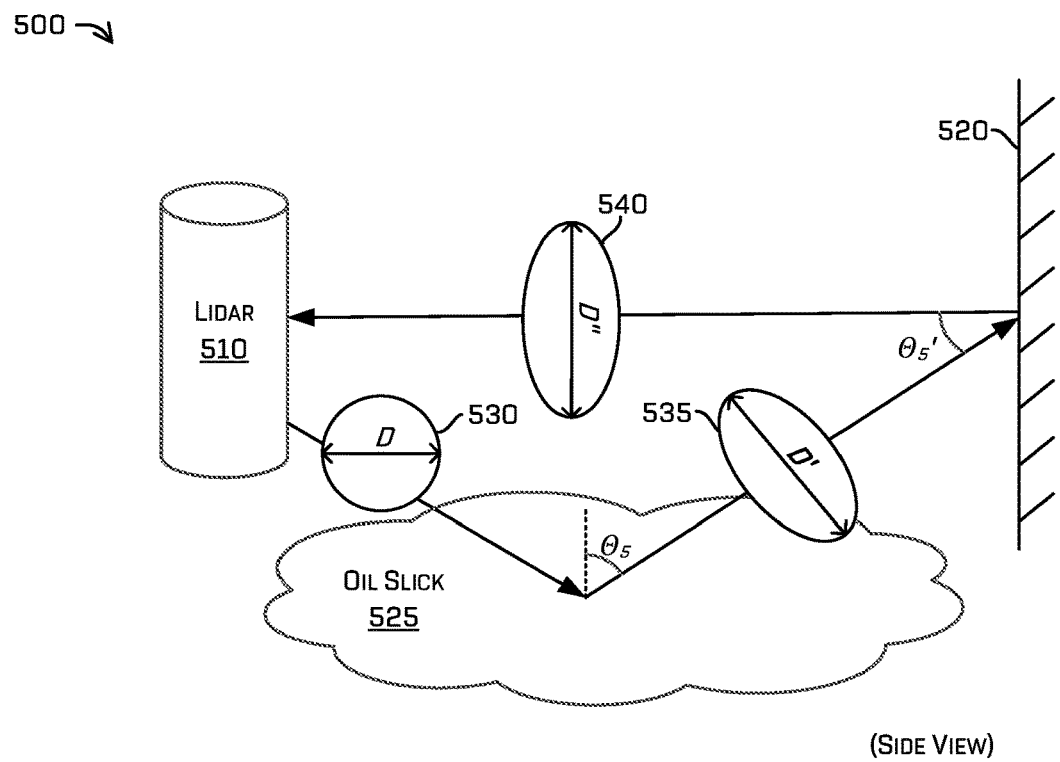
FIG. 5 is a diagram of another example environment and example lidar pulses emitted and reflected in the environment, in accordance with examples of the disclosure.

In various examples, the shape of a return pulse may be compared to that of an initially emitted pulse and used to determine whether a multipath and/or indirect reflection has occurred in the reflection path. FIG. 5 is a side view another example environment 500 in which a lidar 510 may be configured. The lidar 510 may be any one or more sensor systems as described herein and/or a component thereof, such as one or more of the components and systems illustrated in FIG. 10 or FIG. 11 and described below.

The lidar 510 may emit a lidar pulse 530 into the environment 500. The lidar 510 may be configured to emit the lidar pulse 530 with a particular cross-sectional shape. For example, the lidar 510 may be configured to generate the pulse 530 with a symmetrical circular shape having a diameter d, as shown in this figure.

The pulse 530 may reflect from a surface of an oil slick 525 in the environment 500, resulting in reflected pulse 535. The reflection of the pulse 530 on the oil slick 525 may cause an alteration of the shape of the pulse 530 resulting in reflected pulse 535. For example, a relatively horizontal reflection of the pulse 530 from a horizontal surface such as the oil slick 525 may distort the shape of the pulse 530 into the shape of the reflected pulse 535 such that the reflected pulse 535 has a larger diameter d' than the diameter d of the initially emitted pulse 530.

In some examples, the reflection off of the oil slick 525 may cause the subsequent reflected pulse 540 reflected off of the surface 520 to have a further distorted shape. In examples, the more acute the angle $\theta_5$ measured from the normal to the surface of the oil slick 525, the greater the angle of reflection $\theta_5'$ from the normal at the subsequent surface 520, and therefore the greater the distortion of the return pulse 540. Therefore, a sensor system or vehicle computing system may use the amount of alteration of a return pulse shape to determine the extent of the multipath effect on the return pulse. For example, a return pulse that has a significantly distorted cross-sectional shape when compared to an emitted pulse may have reflected from a surface much farther from the ultimate reflection object than a return pulse that is less distorted.

By comparing a shape of a cross-section of a return pulse to a shape of a cross-section of an initially emitted pulse, a sensor system or vehicle computing system may determine whether the return pulse is likely to have been affected by multipath and/or indirect reflections without necessarily determining whether other lidar properties have been affected. Alternatively, a sensor system or vehicle computing system may evaluate changes in return pulse cross-section shapes in conjunction with evaluating any other lidar properties or other return pulse properties as described herein to determine whether the return pulse has been affected by multipath and/or indirect reflections.

In addition, or instead, a sensor system or vehicle computing system may evaluate other data that may be associated with and/or determined from a return pulse to determine additional information that may be used to determine an overall likelihood that a multipath reflection has occurred as described herein. For example, a multipath reflection probability determination may be augmented by and/or based on, for example, a distance measurement associated with the return pulse, an amplitude of the emitted pulse, an amplitude of the return pulse, a determined reflectivity of a surface off of which the return has reflected, and/or a power of the return pulse (e.g., as compared to the emitted pulse).

Figure 6:
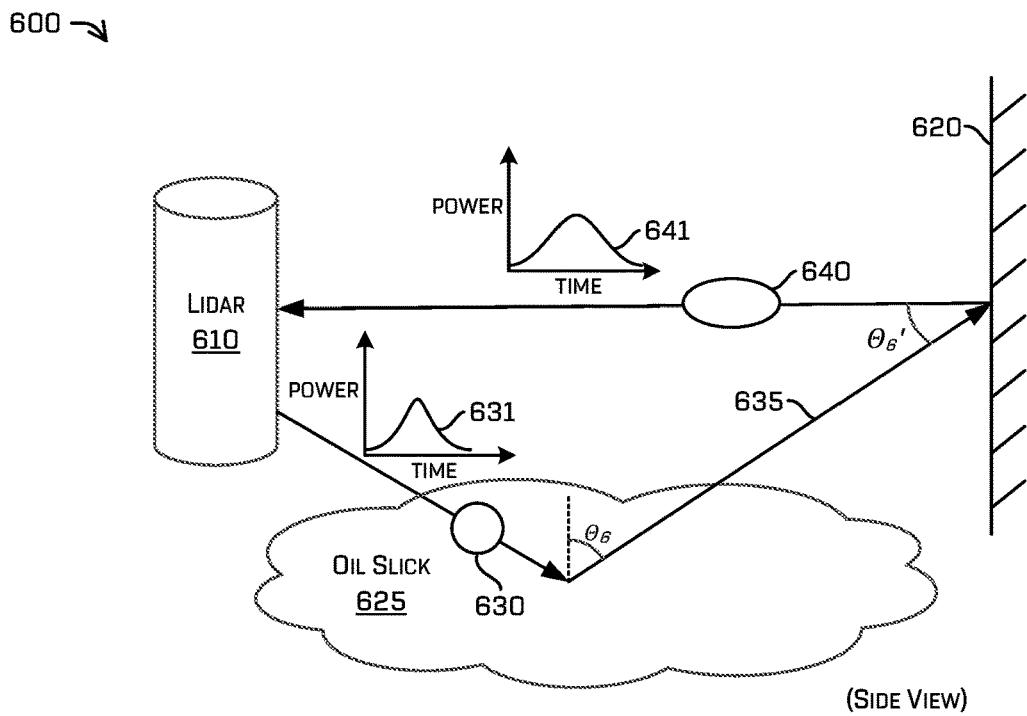
FIG. 6 is a diagram of another example environment and example lidar pulses emitted and reflected in the environment, in accordance with examples of the disclosure.

In various examples, the temporal shape of a return pulse may be compared to that of an initially emitted pulse and used to determine whether a multipath and/or indirect reflection has occurred in the reflection path. As used herein, a temporal shape of a pulse is a measurement or indication of the power or intensity of a lidar pulse over time (e.g., represented graphically as power (y axis) vs. time (x axis)). FIG. 6 is a side view another example environment 600 in which a lidar 610 may be configured. The lidar 610 may be any one or more sensor systems as described herein and/or a component thereof, such as one or more of the components and systems illustrated in FIG. 10 or FIG. 11 and described below.

The lidar 610 may emit a lidar pulse 630 into the environment 600. The lidar 610 may be configured to emit the lidar pulse 630 with a particular temporal shape. For example, the lidar 610 may be configured to begin generating the pulse 630 at a base power at a pulse initiation time, rising over a first amount of time to a highest power, and falling over a second amount of time to return to the initial, base power at a pulse termination time, as represented by graph 631 in FIG. 6.

The pulse 630 may reflect from a surface of an oil slick 625 in the environment 600, resulting in reflected pulse 635. The reflection of the pulse 630 on the oil slick 525 may cause an alteration of the temporal shape of the pulse 630 resulting in reflected pulse 635. For example, a relatively horizontal reflection of the pulse 630 from a horizontal surface such as the oil slick 625 may change (e.g., "stretch") the amount of time that the pulse takes to travel from the oil slick 625 to the next surface 620 as compared to the travel time of the pulse 630 from the lidar 610 to the oil slick 625.

In some examples, the reflection off of the oil slick 625 may cause the subsequent reflected pulse 640 reflected off of the surface 620 to have a further distorted temporal shape (e.g., "stretched" pulse time) as represented by graph 641 in FIG. 6. In examples, the more acute the angle, $\theta_6$, measured from the normal to the surface of the oil slick 625, the greater the angle of reflection $\theta_6'$ from the normal at the subsequent surface 620, and therefore the greater the temporal stretching of the return pulse 640. Therefore, a sensor system or vehicle computing system may use the amount of alteration of a return pulse temporal shape to determine the extent of the multipath effect on the return pulse. For example, a return pulse that takes a significantly longer time to receive than it took to emit the initial pulse may have reflected from a surface much farther from the ultimate reflection object than a return pulse that is less distorted.

By comparing a receipt time or a temporal shape of a return pulse to a transmission time or a temporal shape of an initially emitted pulse, a sensor system or vehicle computing system may determine whether the return pulse has likely been affected by multipath and/or indirect reflections without necessarily determining whether other lidar properties have been affected. Alternatively, a sensor system or vehicle computing system may evaluate temporal aspects of a return pulse in conjunction with evaluating any other lidar properties or other return pulse properties as described herein to determine whether the return pulse has been affected by multipath and/or indirect reflections.

In addition, or instead, a sensor system or vehicle computing system may evaluate other data that may be associated with and/or determined from a return pulse to determine additional information that may be used to determine an overall likelihood that a multipath reflection has occurred as described herein. For example, a multipath reflection probability determination may be augmented by and/or based on, for example, a distance measurement associated with the return pulse, an amplitude of the emitted pulse, an amplitude of the return pulse, a determined reflectivity of a surface off of which the return has reflected, and/or a power of the return pulse (e.g., as compared to the emitted pulse).

Figure 7:
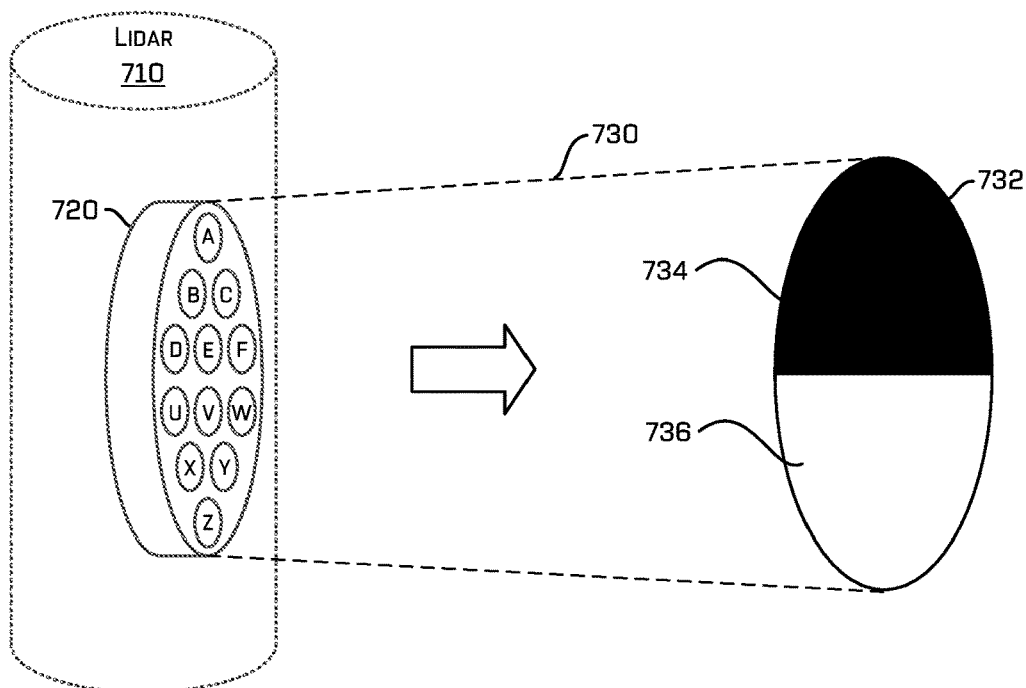
FIG. 7 is a diagram of an example lidar system and an example lidar pulse emitted by the lidar system, in accordance with examples of the disclosure.

FIG. 7 illustrates a block diagram of an example lidar 710 that may be configured to emit lidar pulses as described herein. The lidar 710 may be any one or more sensor systems as described herein and/or a component thereof, such as one or more of the components and systems illustrated in FIG. 10 or FIG. 11 and described below.

The lidar 710 may have lasers 720 that may include individual lasers 720A-F and 720U-Z. The individual lasers 720A-F and 720U-Z may be configured to emit a laser pulse of varying intensity, power, phase, polarity, coherence, spectral content, modulation, and/or other properties, or to not emit a laser. For example, a subset of the lasers 720A-F and 720U-Z may be configured to emit a laser while the remaining lasers 720A-F and 720U-Z may not be configured to emit a laser, resulting in the emission of laser pulse of a particular shape.

For example, as illustrated in this figure, all of the lasers 720A-F and 720U-Z emitting a laser pulse may generate a circular cross-sectional shaped laser pulse 730. The lasers 720A-F may be configured to emit lasers at a relatively higher power than the lasers 720U-Z. This may result in the laser pulse 730 having a cross-section 732, with portion 734 of the cross-section 732 having relatively higher power laser emissions than the portion 736 of the cross-section 732.

Because the individual lasers 720A-F and 720U-Z may be individually controlled and modulated, and because any number of lasers may be configured in the lidar 710, any shape and pattern of laser pulse may be emitted using such lasers. Furthermore, any emitted laser may have any combination of lidar properties. For example, the spectral content (e.g., wavelengths) of a laser emission from any of the individual lasers 720A-F and 720U-Z may be modulated spatially and/or over time during the pulse transmission to generate a pulse having spectral content that varies over space and/or time. In other examples, phase, spectral content, modulation, frequency, polarization, and/or coherence may be modulated over time and/or space (e.g., by using a rotating polarizer). In other examples, any other properties and/or aspects of light and/or laser emissions may be adjusted and/or modulated over time and/or space by lidar 710 to generate a lidar pulse that may be utilized in any of the examples described herein. Further, asymmetry may refer to, herein, any properties of an emission which, when reflected, lead to a measurable difference.

Figure 8:
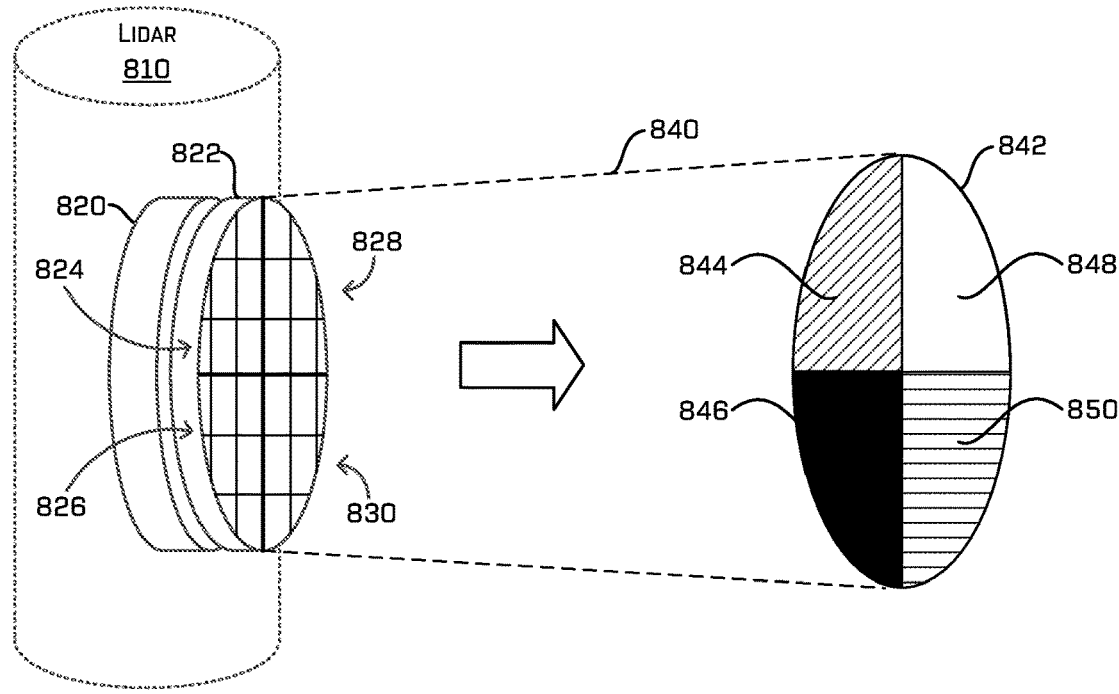
FIG. 8 is a diagram of another example lidar system and an example lidar pulse emitted by the lidar system, in accordance with examples of the disclosure.

Rather than, or in addition to, controlling one or more lasers to generate lidar pulses as described herein, one or more lasers associated with a lidar pulse may be modulated, filtered, and/or otherwise manipulated (e.g., post-emission) to generate lidar pulses as described herein. FIG. 8 illustrates a block diagram of an example lidar 810 that may be configured to emit lidar pulses as described herein. The lidar 210 may be any one or more sensor systems as described herein and/or a component thereof, such as one or more of the components and systems illustrated in FIG. 10 or FIG. 11 and described below.

The lidar 810 may have one or more lasers 820 that may include one or more individual lasers configured to emit a laser pulse of static and/or varying intensity, power, phase, polarity, coherence, spectral content, modulation, etc. The lidar 810 may further have one or more laser modulators 822 that may include one or more filters, modulators, and/or other laser manipulation components.

For example, as illustrated in this figure, the one or more lasers 820 may emit a laser pulse that may be may filtered or otherwise formed into a laser pulse 840 having a cross-section 842. The individual modulators 824, 826, 828, 830 of the one or more laser modulators 822 may be configured to pass lasers at a relatively higher power and/or intensity levels. Alternatively, or in addition, the individual modulators 824, 826, 828, 830 may be configured to pass and/or alter or otherwise modulate any one or more other properties and/or aspects of light and/or laser emissions as described herein, such as spectrum, polarity, coherence, timing, etc.

The modulation of the individual modulators 824, 826, 828, 830 may result in the laser pulse 840 having a cross-section 842 with a portion 844 of the cross-section 842 having a first power and/or intensity level, a portion 846 of the cross-section 842 having a second power and/or intensity level, a portion 848 of the cross-section 842 having a third power and/or intensity level, and a portion 850 of the cross-section 842 having a fourth power and/or intensity level. The individual first, second, third, and fourth power and/or intensity levels may be different from the others, resulting in particular cross-sectional pulse properties that may be used to determine whether the pulse has been subject to multipath effects as described herein.

Because the individual modulators 824, 826, 828, 830 of the one or more laser modulators 822 may be individually controlled and modulated, and because any number of lasers and modulators may be configured in the lidar 810, any shape and pattern of laser pulse may be emitted using such lasers and modulators. Furthermore, any emitted laser may be modulated to have any combination of lidar properties. For example, any one or more of the individual modulators 824, 826, 828, 830 of the one or more laser modulators 822 may be configured with a one or more components (e.g., shutter) that alternately block and permit emissions of one or more laser 820 (or any portion thereof) to generate a lidar pulse with a particular shape and/or properties (e.g., a constantly variable filter). For example, the spectral content of a laser emission from any of the lasers emitted by one or more lasers 820 may be modulated spatially and/or over time by any one or more of the individual modulators 824, 826, 828, 830 of the one or more laser modulators 822 during or after the pulse transmission to generate a pulse having spectral content that varies over space and/or time. In other examples, phase, spectral content, modulation, frequency, polarization, and/or coherence may be modulated over time and/or space (e.g., by using a rotating polarizer) by any one or more of the individual modulators 824, 826, 828, 830 of the one or more laser modulators 822. In other examples, any other properties and/or aspects of light and/or laser emissions may be adjusted and/or modulated over time and/or space by any one or more of the individual modulators 824, 826, 828, 830 of the one or more laser modulators 822 configured at the lidar 810 to generate a lidar pulse that may be utilized in any of the examples described herein. Further, asymmetry may refer to, herein, any properties of an emission which, when reflected, lead to a measurable difference.

Figure 9:
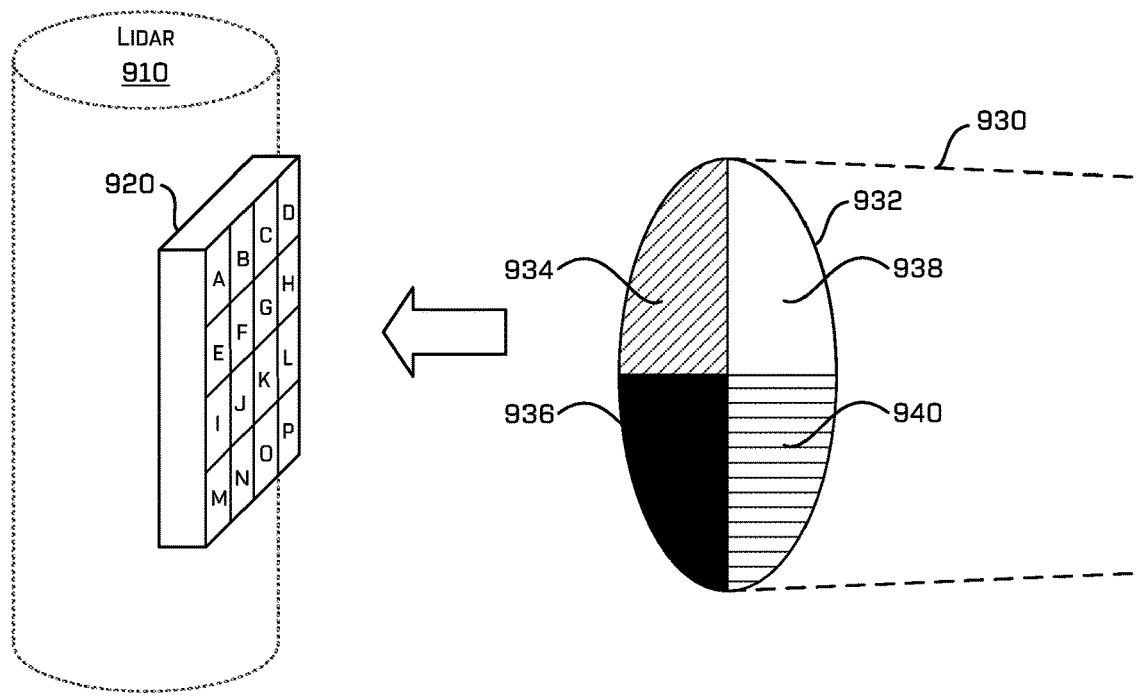
FIG. 9 is a diagram of another example lidar system and an example lidar pulse detected by the lidar system, in accordance with examples of the disclosure.

In order to determine the lidar properties of a reflected lidar pulse (e.g., as represented in a cross-section of such a pulse), a lidar system may use one or more lidar sensors, such as one or more photodetectors. FIG. 9 illustrates a block diagram of an example lidar 910 that may be configured to detect lidar pulses as described herein. The lidar 910 may be any one or more sensor systems as described herein and/or a component thereof, such as one or more of the components and systems illustrated in FIG. 10 or FIG. 11 and described below.

The lidar 910 may have one or more photodetectors 920 that may include individual photodetectors 920A-P. In various examples, the individual photodetectors 920A-P may detect particular cross-sectional portions of a received lidar pulse, such as lidar pulse 930, that may be reflected from one or more surfaces in an environment.

For example, as illustrated in this figure, the pulse 930 may has a cross-section 932 with portions 934, 936, 938, and 940 that may have distinct lidar properties. For instance, the portion 934 of the cross-section 932 may have a first power and/or intensity level, the portion 936 of the cross-section 932 may have a second power and/or intensity level, the portion 938 of the cross-section 932 may have a third power and/or intensity level, and the portion 940 of the cross-section 932 may have a fourth power and/or intensity level. Alternatively, or in addition, the individual portions 934, 936, 938, and 940 may have any one or more other properties and/or aspects of light and/or laser emissions as described herein, such as spectrum, polarity, coherence, timing, etc.

The individual photodetectors 920A-P may detect one or more lidar properties within particular sections of a cross-section of a lidar pulse. For example, the individual photodetectors 920A, B, E, F may detect a quarter of a received lidar pulse, such as the portion 938 of the cross-section 932 of the reflected lidar pulse 930. Similarly, the individual photodetectors 920C, D, G, H may detect another quarter of a received lidar pulse, such as the portion 934 of the cross-section 932 of the reflected lidar pulse 930, and so forth. As shown in this figure, the individual photodetectors 920A-P may individually detect 16 portions of a lidar pulse cross-section, allowing for the detection of relatively sophisticated patterns of lidar properties in a pulse cross-section.

In other example, various other numbers of detectors of any type, and any combination thereof, may be used to detect reflected lidar pulses. For example, two or four detectors may be used to detect relatively simple patterns of lidar properties within a cross-section of a reflected lidar pulse. In other examples, many detectors (e.g., 16, 36, 100, etc.) may be used to detect relatively complex patterns of lidar properties within a cross-section of a reflected lidar pulse. Such detectors may also, or instead, detect other properties than laser intensity and/or power. For example, such detectors may detect the spectral content, frequency, polarization, and/or coherence of a laser emission over time and/or space. Such detectors may detect any properties of an emission that may be measured and compared to an initially emitted emission to determine a measurable difference.

FIG. 10 illustrates a perspective view 1000 of an environment in which a vehicle 1002 may be traveling. The environment may contain one or more objects, such as a traffic signal 1006 and oil slick 1004. To safely navigate through this environment, a vehicle computing system operating the vehicle 1002 may use one or more sensor systems 1020 to emit signals, receive reflected signals, and process such reflected signals to generate data that may be used in object detection operations.

For example, the vehicle 1002 may be configured with one or more lidar sensor systems 1022. The vehicle computing system may operate the lidar system 1022 to emit an initial lidar pulse 1008 (solid arrow) into the environment. This initial pulse 1008 may be reflected back to the lidar system 1022 via one or more paths. For example, a return pulse 1010 (arrow with large dashes) may be a pulse reflected directly from a surface of the traffic signal 1006, providing a reflected pulse that may be measured in the various ways described herein to generate data that can be used for detecting the traffic signal 1006 and performing associated operations.

For example, the processor(s) 1024 and memory 1026 of the sensor system 1020 may process the return pulse 1010 to determine whether its lidar properties (e.g., cross-sectional intensity and/or power, temporal shape, cross-sectional shape, etc.) are substantially similar to or substantially different than those of the initial pulse 1008. In response to determining that the return pulse 1010 has lidar properties that are substantially similar to those of the initial pulse 1008, the processor 1024 may generate data that may be provided to the perception component 1032 of the vehicle control system 1030 performing object detection operations. The perception component 1032 may then provide surface detection data and/or object detection data to the planning component 1034 for trajectory and route planning for the vehicle 1002.

As described herein, reflected pulses resulting from the emission of an initial pulse into an environment may be affected by other objects in the environment, rendering such reflected pulses less useful in performing object detection. For example, a return pulse 1012 (arrow with small dashes) may reflect first off of the surface of the oil slick 1004, and then off of the surface of the traffic signal 1006, before being received at the lidar system 1022. The processor(s) 1024 and memory 1026 of the sensor system 1020 may process the return pulse 1012 to determine whether its lidar properties are substantially similar to or substantially different from those of the initial pulse 1008. In response to determining that the return pulse 1012 has lidar properties that are substantially different than those of the initial pulse 1008, the processor 1024 may determine that the return pulse 1012 is likely the result of multipath and/or indirect reflection and may discard data associated with the pulse 1012, preventing the perception component 1032 from unnecessarily expending resources processing such data.

FIG. 11 depicts a block diagram of an example system 1100 for implementing the techniques described herein. In at least one example, the system 1100 can include a vehicle 1102. The vehicle 1102 can include a vehicle computing device 1104 that may function as and/or perform the functions of a vehicle controller for the vehicle 1102. The vehicle 1102 can also include one or more sensor systems 1106, one or more emitters 1108, one or more communication connections 1110, at least one direct connection 1112, and one or more drive systems 1114.

The vehicle computing device 1104 can include one or more processors 1116 and memory 1118 communicatively coupled with the one or more processors 1116. In the illustrated example, the vehicle 1102 is an autonomous vehicle; however, the vehicle 1102 could be any other type of vehicle. In the illustrated example, the memory 1118 of the vehicle computing device 1104 stores a localization component 1120, a perception component 1122, a planning component 1124, one or more system controllers 1126, one or more maps 1128, and a prediction component 1130. Though depicted in FIG. 11 as residing in memory 1118 for illustrative purposes, it is contemplated that any one or more of the localization component 1120, the perception component 1122, the planning component 1124, the one or more system controllers 1126, the one or more maps 1128, and the prediction component 1130 can additionally, or alternatively, be accessible to the vehicle 1102 (e.g., stored remotely).

In at least one example, the localization component 1120 can include functionality to receive data from the sensor system(s) 1106 to determine a position and/or orientation of the vehicle 1102 (e.g., one or more of an x-, y-, z-position, roll, pitch, or yaw). For example, the localization component 1120 can include and/or request/receive a map of an environment and can continuously determine a location and/or orientation of the autonomous vehicle within the map. In some instances, the localization component 1120 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 1120 can provide data to various components of the vehicle 1102 to determine an initial position of an autonomous vehicle for generating a trajectory and/or for generating map data, as discussed herein.

In some instances, the perception component 1122 can include functionality to perform object detection, segmentation, and/or classification. For example, the perception component 1122 may include functionality to analyze pulse data to determine whether return pulses are likely to be multipath return pulse or single reflection return pulses, as described herein. In some examples, the perception component 1122 can provide processed sensor data that indicates a presence of an entity that is proximate to the vehicle 1102 and/or a classification of the entity as an entity type (e.g., car, pedestrian, cyclist, animal, building, tree, road surface, curb, sidewalk, traffic signal, traffic light, car light, brake light, unknown). In additional or alternative examples, the perception component 1122 can provide processed sensor data that indicates one or more characteristics associated with a detected entity (e.g., a tracked object) and/or the environment in which the entity is positioned. The perception component 1122 may use the multichannel data structures as described herein, such as the multichannel data structures generated by the described deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure as described herein (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc. In some examples, the perception component 1122 can provide processed return pulse data as described herein.

In general, the planning component 1124 can determine a path for the vehicle 1102 to follow to traverse through an environment. In some examples, the planning component 1124 can determine various routes and trajectories and various levels of detail. For example, the planning component 1124 can determine a route (e.g., planned route) to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 1124 can generate an instruction for guiding the autonomous vehicle along at least a portion of the route from the first location to the second location. In at least one example, the planning component 1124 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 1102 to navigate.

In at least one example, the vehicle computing device 1104 can include one or more system controllers 1126, which can be configured to control steering, propulsion, braking, safety, emitters, communication, and other systems of the vehicle 1102. These system controller(s) 1126 can communicate with and/or control corresponding systems of the drive system(s) 1114 and/or other components of the vehicle 1102.

The memory 1118 can further include one or more maps 1128 that can be used by the vehicle 1102 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 1128 can include at least one map (e.g., images and/or a mesh). In some examples, the vehicle 1102 can be controlled based at least in part on the maps 1128. That is, the maps 1128 can be used in connection with the localization component 1120, the perception component 1122, and/or the planning component 1124 to determine a location of the vehicle 1102, identify objects in an environment, and/or generate routes and/or trajectories to navigate within an environment.

In some examples, the one or more maps 1128 can be stored on a remote computing device(s) (such as the computing device(s) 1134) accessible via network(s) 1132. In some examples, multiple maps 1128 can be stored based on, for example, a characteristic (e.g., type of entity, time of day, day of week, season of the year). Storing multiple maps 1128 can have similar memory requirements but increase the speed at which data in a map can be accessed.

In general, the prediction component 1130 can generate predicted trajectories of objects in an environment. For example, the prediction component 1130 can generate one or more predicted trajectories for vehicles, pedestrians, animals, and the like within a threshold distance from the vehicle 1102. In some instances, the prediction component 1130 can measure a trace of an object and generate a trajectory for the object based on observed and predicted behavior. In some examples, the prediction component 1130 can use data and/or data structures based on return pulses as described herein to generate one or more predicted trajectories for various mobile objects in an environment. In some examples, the prediction component 1130 may be a sub-component of perception component 1122.

In some instances, aspects of some or all of the components discussed herein can include any models, algorithms, and/or machine learning algorithms. For example, in some instances, the components in the memory 1118 (and the memory 1138, discussed below) can be implemented as a neural network. For instance, the memory 1118 may include a deep tracking network that may be configured with a convolutional neural network (CNN) that may one or more convolution/deconvolution layers.

An example neural network is an algorithm that passes input data through a series of connected layers to produce an output. Individual layers in a neural network can also comprise another neural network or can comprise any number of layers, and such individual layers may convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 1106 can include radar sensors, ultrasonic transducers, sonar sensors, location sensors (e.g., GPS, compass), inertial sensors (e.g., inertial measurement units (IMUs), accelerometers, magnetometers, gyroscopes), cameras (e.g., RGB, IR, intensity, depth), time of flight sensors, microphones, wheel encoders, environment sensors (e.g., temperature sensors, humidity sensors, light sensors, pressure sensors), etc. The sensor system(s) 1106 can include multiple instances of one or more of these or other types of sensors. For instance, the camera sensors can include multiple cameras disposed at various locations about the exterior and/or interior of the vehicle 1102. The sensor system(s) 1106 can provide input to the vehicle computing device 1104. Additionally, or alternatively, the sensor system(s) 1106 can send sensor data, via the one or more networks 1132, to the one or more computing device(s) at a particular frequency, after a lapse of a predetermined period of time, in near real-time, etc.

In some examples, the sensor system(s) 1106 can include one or more lidar systems, such as one or more monostatic lidar systems, bistatic lidar systems, rotational lidar systems, solid state lidar systems, and/or flash lidar systems. In some examples, the sensor system(s) 1106 may also, or instead, include functionality to analyze pulses and pulse data to determine whether return pulses are likely to be multipath return pulse or single reflection return pulses, as described herein. In particular examples, a lidar system of the sensor system(s) 1106 may perform one or more of the operations described herein to analyze pulses and pulse data to determine whether return pulses are likely to be multipath return pulse or single reflection return pulses. Alternatively, or in addition, any one or more other components of the vehicle computing device 1104 may perform one or more of the operations described herein to analyze pulses and pulse data to determine whether return pulses are likely to be multipath return pulse or single reflection return pulses.

The vehicle 1102 can also include one or more emitters 1108 for emitting light (visible and/or non-visible) and/or sound. The emitter(s) 1108 in an example include interior audio and visual emitters to communicate with passengers of the vehicle 1102. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners), and the like. The emitter(s) 1108 in this example may also include exterior emitters. By way of example and not limitation, the exterior emitters in this example include lights to signal a direction of travel or other indicator of vehicle action (e.g., indicator lights, signs, light arrays), and one or more audio emitters (e.g., speakers, speaker arrays, horns) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 1102 can also include one or more communication connection(s) 1110 that enable communication between the vehicle 1102 and one or more other local or remote computing device(s). For instance, the communication connection(s) 1110 can facilitate communication with other local computing device(s) on the vehicle 1102 and/or the drive system(s) 1114. Also, the communication connection(s) 1110 can allow the vehicle to communicate with other nearby computing device(s) (e.g., other nearby vehicles, traffic signals). The communications connection(s) 1110 also enable the vehicle 1102 to communicate with a remote teleoperations computing device or other remote services.

The communications connection(s) 1110 can include physical and/or logical interfaces for connecting the vehicle computing device 1104 to another computing device or a network, such as network(s) 1132. For example, the communications connection(s) 1110 can enable Wi-Fi-based communication such as via frequencies defined by the IEEE 802.11 standards, short range wireless frequencies such as Bluetooth, cellular communication (e.g., 2G, 3G, 4G, 4G LTE, 5G) or any suitable wired or wireless communications protocol that enables the respective computing device to interface with the other computing device(s).

In at least one example, the vehicle 1102 can include one or more drive systems 1114. In some examples, the vehicle 1102 can have a single drive system 1114. In at least one example, if the vehicle 1102 has multiple drive systems 1114, individual drive systems 1114 can be positioned on opposite ends of the vehicle 1102 (e.g., the front and the rear). In at least one example, the drive system(s) 1114 can include one or more sensor systems to detect conditions of the drive system(s) 1114 and/or the surroundings of the vehicle 1102. By way of example and not limitation, the sensor system(s) 1106 can include one or more wheel encoders (e.g., rotary encoders) to sense rotation of the wheels of the drive systems, inertial sensors (e.g., inertial measurement units, accelerometers, gyroscopes, magnetometers) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 1114. In some cases, the sensor system(s) on the drive system(s) 1114 can overlap or supplement corresponding systems of the vehicle 1102 (e.g., sensor system(s) 1106).

The drive system(s) 1114 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port). Additionally, the drive system(s) 1114 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 1114. Furthermore, the drive system(s) 1114 may also include one or more communication connection(s) that enable communication by the respective drive system with one or more other local or remote computing device(s).

In at least one example, the direct connection 1112 can provide a physical interface to couple the one or more drive system(s) 1114 with the body of the vehicle 1102. For example, the direct connection 1112 can allow the transfer of energy, fluids, air, data, etc. between the drive system(s) 1114 and the vehicle. In some instances, the direct connection 1112 can further releasably secure the drive system(s) 1114 to the body of the vehicle 1102.

In some examples, the vehicle 1102 can send sensor data to one or more computing device(s) 1134 via the network(s) 1132. In some examples, the vehicle 1102 can send raw sensor data to the computing device(s) 1134. In other examples, the vehicle 1102 can send processed sensor data and/or representations of sensor data (e.g., data representing return pulses) to the computing device(s) 1134. In some examples, the vehicle 1102 can send sensor data to the computing device(s) 1134 at a particular frequency, after a lapse of a predetermined period of time, in near real-time, etc. In some cases, the vehicle 1102 can send sensor data (raw or processed) to the computing device(s) 1134 as one or more log files.

The computing device(s) 1134 can include processor(s) 1136 and a memory 1138 storing a planning component 1142 and/or a perception component 1140. In some instances, the perception component 1140 can substantially correspond to the perception component 1122 and can include substantially similar functionality. In some instances, the planning component 1142 can substantially correspond to the planning component 1124 and can include substantially similar functionality.

The processor(s) 1116 of the vehicle 1102 and the processor(s) 1136 of the computing device(s) 1134 can be any suitable processor capable of executing instructions to process data and perform operations as described herein. By way of example and not limitation, the processor(s) 1116 and 1136 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs), gate arrays (e.g., FPGAs), and other hardware devices can also be considered processors in so far as they are configured to implement encoded instructions.

Memory 1118 and 1138 are examples of non-transitory computer-readable media. The memory 1118 and 1138 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 11 is illustrated as a distributed system, in alternative examples, components of the vehicle 1102 can be associated with the computing device(s) 1134 and/or components of the computing device(s) 1134 can be associated with the vehicle 1102. That is, the vehicle 1102 can perform one or more of the functions associated with the computing device(s) 1134, and vice versa.

EXAMPLE CLAUSES

The following paragraphs describe various examples. Any of the examples in this section may be used with any other of the examples in this section and/or any of the other examples or embodiments described herein.

A: A system comprising: one or more processors; and one or more non-transitory computer-readable media storing instructions executable by the one or more processors, wherein the instructions, when executed, cause the system to perform operations comprising: emitting a lidar pulse having a first intensity associated with a first cross-sectional portion of the lidar pulse and a second intensity associated with a second cross-sectional portion of the lidar pulse into an environment; receiving a reflected lidar pulse; determining a first reflected intensity associated with a first cross-sectional portion of the reflected lidar pulse and a second reflected intensity associated with a second cross-sectional portion of the reflected lidar pulse; determining, based at least in part on the first intensity, the second intensity, the first reflected intensity, and the second reflected intensity, a likelihood that the reflected lidar pulse is associated with a multipath reflection; and outputting a signal comprising the likelihood.

B: The system of paragraph A, wherein the likelihood is indicative of an absence of the multipath reflection based at least in part on determining that the first intensity is substantially similar to the first reflected intensity and that the second intensity is substantially similar to the second reflected intensity.

C: The system of paragraph A or B, wherein determining the likelihood is further based at least in part on a first amplitude of the lidar pulse and a second amplitude of the reflected lidar pulse.

D: The system of any of paragraphs A-C, wherein determining the likelihood comprises determining the likelihood is indicative of the multipath reflection based at least in part on determining that the first intensity is substantially different from the first reflected intensity and that the second intensity is substantially different from the second reflected intensity.

E: The system of any of paragraphs A-D, wherein emitting the lidar pulse comprises one or more of: emitting a plurality of laser pulses having differing intensities, controlling a shutter over one or more of the first or second cross-sectional portions of the lidar pulse, or modulating the lidar pulse.

F: A method comprising: emitting an emitted lidar pulse associated with a property that varies across a cross-section of the emitted lidar pulse into an environment; receiving a reflected lidar pulse; determining, based at least in part on the emitted lidar pulse, the reflected lidar pulse, and the property, a likelihood that the reflected lidar pulse is associated with a multipath reflection; and outputting the likelihood.

G: The method of paragraph F, wherein determining the likelihood is further based at least in part on comparing the property in a first cross-sectional portion of the emitted lidar pulse to the property in a second cross-sectional portion of the reflected lidar pulse.

H: The method of paragraph F or G, wherein the property comprises one or more of: phase, spectral content, intensity, power, polarization, coherence, a cross-sectional width, or a cross-sectional height.

I: The method of any of paragraphs F-H, wherein: the property is a cross-sectional shape; and determining the likelihood comprises determining whether a first cross-sectional shape of the emitted lidar pulse is substantially similar to a second cross-sectional shape of the reflected lidar pulse.

J: The method of any of paragraphs F-I, wherein: the property is a pulse width; and determining the likelihood comprises determining whether a first pulse width of the emitted lidar pulse is substantially similar to a second pulse width of the reflected lidar pulse.

K: The method of any of paragraphs F-J, wherein: the property is a spectral content; and determining the likelihood comprises determining whether a first spectral content associated with the emitted lidar pulse is substantially similar to a second spectral content associated with the reflected lidar pulse.

L: The method of any of paragraphs F-K, wherein emitting the emitted lidar pulse comprises one or more of: emitting the emitted lidar pulse through a filter that varies across the cross-section of the emitted lidar pulse, emitting the emitted lidar pulse through a modulator that varies across the cross-section of the emitted lidar pulse, or emitting the emitted lidar pulse through a shutter that varies across the cross-section of the emitted lidar pulse.

M: The method of any of paragraphs F-L, wherein determining the likelihood comprises determining the likelihood is indicative of an absence of the multipath reflection based at least in part on determining a first distribution of the property in a first cross-section of the emitted lidar pulse is substantially similar to a second distribution of the property in a second cross-section of the reflected lidar pulse.

N: The method of any of paragraphs F-M, wherein determining the likelihood comprises determining the likelihood is indicative of the multipath reflection based at least in part on determining that the likelihood meets a threshold.

O: One or more non-transitory computer-readable media storing instructions that, when executed by one or more processors, perform operations comprising: emitting an emitted lidar pulse associated with a property that varies across a cross-section of the emitted lidar pulse into an environment; receiving a reflected lidar pulse; determining, based at least in part on the emitted lidar pulse, the reflected lidar pulse, and the property, a likelihood that the reflected lidar pulse is associated with a multipath reflection; and outputting the likelihood.

P: The one or more non-transitory computer-readable media of paragraph O, wherein the property is associated with a modulation of the emitted lidar pulse.

Q: The one or more non-transitory computer-readable media of paragraph O or P, wherein the operations further comprise controlling an autonomous vehicle based at least in part on the likelihood.

R: The one or more non-transitory computer-readable media of any of paragraphs O-Q, wherein determining the likelihood comprises determining whether a first distribution of the property in a first cross-section of the emitted lidar pulse substantially differs from a second distribution of the property in a second cross-section the reflected lidar pulse.

S: The one or more non-transitory computer-readable media of any of paragraphs O-R, wherein determining the likelihood comprises determining whether a first shape of a first cross-section of the emitted lidar pulse substantially differs from a second shape of a second cross-section the reflected lidar pulse of the reflected lidar pulse.

T: The one or more non-transitory computer-readable media of any of paragraphs O-T, wherein determining the likelihood is further based at least in part on a first amplitude of the emitted lidar pulse and a second amplitude of the reflected lidar pulse.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
emitting a lidar pulse associated with a first time, wherein the lidar pulse includes, at the first time, a first intensity associated with a first cross-sectional portion of the lidar pulse and a second intensity associated with a second cross-sectional portion of the lidar pulse into an environment;
receiving a reflected lidar pulse;
determining a first reflected intensity associated with a first cross-sectional portion of the reflected lidar pulse and a second reflected intensity associated with a second cross-sectional portion of the reflected lidar pulse;
determining, based at least in part on the first intensity, the second intensity, the first reflected intensity, and the second reflected intensity, a likelihood that the reflected lidar pulse is associated with a multipath reflection; and
outputting a signal comprising the likelihood.

2. The system of claim 1, wherein the likelihood is indicative of an absence of the multipath reflection based at least in part on determining that the first intensity is substantially similar to the first reflected intensity and that the second intensity is substantially similar to the second reflected intensity.

3. The system of claim 1, wherein determining the likelihood is further based at least in part on a first amplitude of the lidar pulse and a second amplitude of the reflected lidar pulse.

4. The system of claim 1, wherein determining the likelihood comprises determining the likelihood is indicative of the multipath reflection based at least in part on determining that the first intensity is substantially different from the first reflected intensity and that the second intensity is substantially different from the second reflected intensity.

5. The system of claim 1, wherein emitting the lidar pulse comprises one or more of:
emitting a plurality of laser pulses having differing intensities,
controlling a shutter over one or more of the first or second cross-sectional portions of the lidar pulse, or
modulating the lidar pulse.

6. A method comprising:
emitting an emitted lidar pulse associated with a first time, wherein the emitted lidar pulse includes, at the first time, a property that varies across a cross-section of the emitted lidar pulse into an environment;
receiving a reflected lidar pulse;
determining, based at least in part on the emitted lidar pulse, the reflected lidar pulse, and the property, a likelihood that the reflected lidar pulse is associated with a multipath reflection; and
outputting the likelihood.

7. The method of claim 6, wherein determining the likelihood is further based at least in part on comparing the property in a first cross-sectional portion of the emitted lidar pulse to the property in a second cross-sectional portion of the reflected lidar pulse.

8. The method of claim 6, wherein the property comprises one or more of:
phase,
spectral content,
intensity,
power,
polarization,
coherence,
a cross-sectional width, or
a cross-sectional height.

9. The method of claim 6, wherein:
the property is a cross-sectional shape; and
determining the likelihood comprises determining whether a first cross-sectional shape of the emitted lidar pulse is substantially similar to a second cross-sectional shape of the reflected lidar pulse.

10. The method of claim 6, wherein:
the property is a pulse width; and
determining the likelihood comprises determining whether a first pulse width of the emitted lidar pulse is substantially similar to a second pulse width of the reflected lidar pulse.

11. The method of claim 6, wherein:
the property is a spectral content; and
determining the likelihood comprises determining whether a first spectral content associated with the emitted lidar pulse is substantially similar to a second spectral content associated with the reflected lidar pulse.

12. The method of claim 6, wherein emitting the emitted lidar pulse comprises one or more of:
emitting the emitted lidar pulse through a filter that varies across the cross-section of the emitted lidar pulse,
emitting the emitted lidar pulse through a modulator that varies across the cross-section of the emitted lidar pulse, or
emitting the emitted lidar pulse through a shutter that varies across the cross-section of the emitted lidar pulse.

13. The method of claim 6, wherein determining the likelihood comprises determining the likelihood is indicative of an absence of the multipath reflection based at least in part on determining a first distribution of the property in a first cross-section of the emitted lidar pulse is substantially similar to a second distribution of the property in a second cross-section of the reflected lidar pulse.

14. The method of claim 6, wherein determining the likelihood comprises determining the likelihood is indicative of the multipath reflection based at least in part on determining that the likelihood meets a threshold.

15. One or more non-transitory computer-readable media storing instructions that, when executed by one or more processors, perform operations comprising:
emitting an emitted lidar pulse associated with a first time, wherein the emitted lidar pulse includes, at the first time, a property that varies across a cross-section of the emitted lidar pulse into an environment;
receiving a reflected lidar pulse;
determining, based at least in part on the emitted lidar pulse, the reflected lidar pulse, and the property, a likelihood that the reflected lidar pulse is associated with a multipath reflection; and
outputting the likelihood.

16. The one or more non-transitory computer-readable media of claim 15, wherein the property is associated with a modulation of the emitted lidar pulse.

17. The one or more non-transitory computer-readable media of claim 15, wherein the operations further comprise controlling an autonomous vehicle based at least in part on the likelihood.

18. The one or more non-transitory computer-readable media of claim 15, wherein determining the likelihood comprises determining whether a first distribution of the property in a first cross-section of the emitted lidar pulse substantially differs from a second distribution of the property in a second cross-section the reflected lidar pulse.

19. The one or more non-transitory computer-readable media of claim 15, wherein determining the likelihood comprises determining whether a first shape of a first cross-section of the emitted lidar pulse substantially differs from a second shape of a second cross-section the reflected lidar pulse of the reflected lidar pulse.

20. The one or more non-transitory computer-readable media of claim 15, wherein determining the likelihood is further based at least in part on a first amplitude of the emitted lidar pulse and a second amplitude of the reflected lidar pulse.

\* \* \* \* \*